(12) United States Patent
Hayashi et al.

(10) Patent No.: US 9,248,831 B2
(45) Date of Patent: Feb. 2, 2016

(54) DRIVE CONTROL DEVICE FOR HYBRID VEHICLE

(75) Inventors: Koji Hayashi, Aichi-gun (JP); Hiroyasu Harada, Toyota (JP); Tomohito Ono, Gotenba (JP); Hiroyuki Ishii, Nisshin (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 14/387,603

(22) PCT Filed: Mar. 26, 2012

(86) PCT No.: PCT/JP2012/057811
§ 371 (c)(1),
(2), (4) Date: Sep. 24, 2014

(87) PCT Pub. No.: WO2013/145092
PCT Pub. Date: Oct. 3, 2013

(65) Prior Publication Data
US 2015/0321661 A1    Nov. 12, 2015

(51) Int. Cl.
*B60L 9/00* (2006.01)
*B60W 20/00* (2006.01)
(Continued)

(52) U.S. Cl.
CPC ............. *B60W 20/40* (2013.01); *B60K 6/365* (2013.01); *B60K 6/445* (2013.01); *B60W 10/02* (2013.01);
(Continued)

(58) Field of Classification Search
CPC .............................. B60W 10/06; B60W 20/40
USPC .......................................................... 701/22
See application file for complete search history.

(56) References Cited

U.S. PATENT DOCUMENTS 4,887,490 A * 12/1989 Russ ..................... B64C 1/1407
244/137.1

(Continued)

FOREIGN PATENT DOCUMENTS

| JP | 2008-265600 A | 11/2008 |
|---|---|---|
| WO | 2013/014777 A1 | 1/2013 |
| WO | 2013/140540 A1 | 9/2013 |

*Primary Examiner* — Behrang Badii
*Assistant Examiner* — Daniel L Greene
(74) *Attorney, Agent, or Firm* — Sughrue Mion, PLLC

(57) ABSTRACT

A drive control device for a hybrid vehicle is provided with a differential device including four rotary elements; and an engine, first and second electric motors and an output rotary member which are respectively connected to the four rotary elements. One of the four rotary elements is constituted by a rotary component of a first differential mechanism and a rotary component of a second differential mechanism selectively connected through a clutch, and one of the rotary components is selectively fixed to a stationary member through a brake. The drive control device comprises: an engine start control portion configured to switch an operating state of the clutch during cranking of the engine to raise its speed for starting the engine. The engine start control portion includes: a first clutch controlling portion configured to place the clutch in one of a released state and an engaged state in which a difference between a first dwelling speed to be established in a first half period of a rise of a speed of the engine and a first resonance speed of a drive line extending from the engine to the first electric motor connected to the first differential mechanism through a torsional damper is larger in the other of the released and engaged states, the first resonance speed corresponding to an explosion 1-order frequency of the engine; and a second clutch controlling portion configured to place the clutch in one of the released and engaged states in which a difference between a second dwelling speed to be established in a second half period of the rise of the speed of the engine and a predetermined second resonance speed of the drive line is larger in the other of the released and engaged states, the predetermined second resonance speed corresponding to a revolution 0.5-order pulsation frequency of the engine.

6 Claims, 13 Drawing Sheets

(51) Int. Cl.
 *B60W 10/06* (2006.01)
 *B60W 10/02* (2006.01)
 *B60K 6/445* (2007.10)
 *B60K 6/365* (2007.10)
 *B60W 30/20* (2006.01)

(52) U.S. Cl.
 CPC .............. *B60W 10/06* (2013.01); *B60W 30/20* (2013.01); *B60W 2030/206* (2013.01); *Y10S 903/93* (2013.01)

(56) References Cited

U.S. PATENT DOCUMENTS

| | | | | |
|---|---|---|---|---|
| 5,034,893 | A * | 7/1991 | Fisher | F02P 17/08 340/439 |
| 6,336,063 | B1 * | 1/2002 | Lennevi | B60K 6/28 180/65.1 |
| 6,397,963 | B1 * | 6/2002 | Lennevi | B60K 6/365 180/65.235 |
| 6,683,389 | B2 * | 1/2004 | Geis | B60K 6/28 180/65.22 |
| 6,960,152 | B2 * | 11/2005 | Aoki | B60L 15/20 477/3 |
| 7,055,636 | B2 * | 6/2006 | Komiyama | B60K 6/365 180/65.23 |
| 7,207,306 | B2 * | 4/2007 | Kondo | F01L 1/053 123/179.18 |
| 7,217,221 | B2 * | 5/2007 | Sah | B60K 6/445 477/3 |
| 8,517,890 | B2 * | 8/2013 | Hayashi | B60K 6/445 180/65.285 |
| 2002/0052677 | A1 * | 5/2002 | Lasson | B60K 6/365 701/22 |
| 2002/0063002 | A1 * | 5/2002 | Lasson | B60K 6/28 180/65.235 |
| 2002/0065165 | A1 * | 5/2002 | Lasson | B60K 6/445 477/3 |
| 2002/0065589 | A1 * | 5/2002 | Ostberg | B60K 6/445 701/22 |
| 2004/0255904 | A1 * | 12/2004 | Izawa | B60K 6/445 123/352 |
| 2008/0243322 | A1 * | 10/2008 | Nobumoto | B60K 6/442 701/22 |
| 2014/0194238 | A1 | 7/2014 | Ono et al. | |

* cited by examiner

|  | BK | CL | MODE |
|---|---|---|---|
| EV-1 | ○ |  | 1 |
| EV-2 | ○ | ○ | 2 |
| HV-1 | ○ |  | 3 |
| HV-2 |  | ○ | 4 |
| HV-3 |  |  | 5 |

DRIVE CONTROL DEVICE FOR HYBRID VEHICLE

CROSS REFERENCE TO RELATED APPLICATIONS

This application is a National Stage of International Application No. PCT/JP2012/057811, Mar. 26, 2012, the contents of all of which are incorporated herein by reference in their entirety.

TECHNICAL FIELD

The present invention relates to a drive control device for a hybrid vehicle, and more particularly relates to an engine start control to start an engine.

BACKGROUND ART

There is known a hybrid vehicle which is provided with a differential mechanism having a first rotary element connected to a first electric motor, a second rotary element connected to an engine, and a third rotary element connected to an output rotary member and a second electric motor, and a crankshaft locking device for inhibiting a rotary motion of a crankshaft of the engine, and which can run in an electric drive mode in which the first and second electric motors both are operated as a vehicle drive power source.

PRIOR ART DOCUMENT

Patent Document

Patent Document 1: JP-2008-265600 A1

SUMMARY OF THE INVENTION

Object Achieved by the Invention

When the engine in the above-described hybrid vehicle is started in response to an engine starting requirement while a parking position is selected, the first electric motor is operated to raise a speed of the engine, and a fuel is injected into the engine and ignited.

To absorb pulsations and vibration noises of an output torque of the engine, a torsional damper is disposed between the engine and a differential device, for example. In this case, a vibration of a revolution 0.5-order frequency is likely to be generated immediately after initial explosion of the engine, particularly, when the temperature of the engine to be started is low. In addition, upon starting of the engine, an explosion 1-order pulsation is generally generated. Thus, the explosion 1-order pulsation is generated during cranking of the engine to raise its speed, and the revolution 0.5-order frequency pulsation is generated immediately after the initial explosion, so that the frequency of the pulsations is coincident with a main frequency of the torsional damper two times during starting of the engine, resulting in a possibility of generation of vibrations and noises for a long time. Although the vibrations and noises are reduced with a decrease of a spring constant of the above-described torsional damper, a drive line (power transmitting path) extending from the engine to the first electric motor connected to the differential device through the torsional damper has two resonance points corresponding to the explosion 1-order pulsation during cranking of the engine and the revolution 0.5-order frequency pulsation after the initial explosion of the engine. As described above, the drive line suffers from long generation of the noises and vibrations, giving rise to a risk of deterioration of driving comfort of the hybrid vehicle.

The present invention was made in view of the background art described above. It is therefore an object of the present invention to provide a drive control device for a hybrid vehicle, which drive control device permits prevention of long generation of resonance of the drive line and reduces generation of noises and vibrations during starting of the engine.

The inventors of the present invention discovered a fact that a resonance frequency of a drive line that is a power transmitting path from an engine to a first electric motor connected to a differential device through a torsional damper varies depending upon an operating state of a clutch, and a fact that vibrations of the drive line can be effectively reduced by controlling the operating state of the clutch during cranking of the engine, in a hybrid vehicle which has a plurality of drive modes and which is provided with: a first differential mechanism having a first rotary element connected to the above-indicated first electric motor, a second rotary element connected to the above-indicated engine, and a third rotary element connected to an output rotary member; a second differential mechanism having a first rotary element connected to a second electric motor, a second rotary element, and a third rotary element, one of these second and third rotary elements being connected to the third rotary element of the first differential mechanism; the above-indicated clutch for selectively connecting the second rotary element of the first differential mechanism and the other of the second and third rotary elements of the second differential mechanism not connected to the third rotary element of the first differential mechanism, to each other; and a brake for selectively fixing the above-indicated other of the second and third rotary elements of the second differential mechanism not connected to the third rotary element of the first differential mechanism, to a stationary member.

Means for Achieving the Object

The object indicated above is achieved according to the principle of the present invention, which provides a drive control device for a hybrid vehicle provided with: (a) a first differential mechanism and a second differential mechanism which have four rotary elements as a whole; and an engine, a first electric motor, a second electric motor and an output rotary member which are respectively connected to the above-described four rotary elements, and wherein (b) one of the above-described four rotary elements is constituted by the rotary element of the above-described first differential mechanism and the rotary element of the above-described second differential mechanism which are selectively connected to each other through a clutch, and (c) one of the rotary elements of the above-described first and second differential mechanisms which are selectively connected to each other through the above-described clutch is selectively fixed to a stationary member through a brake, (d) the drive control device being characterized by switching an operating state of the above-described clutch during cranking of the above-described engine to raise its speed for starting the above-described engine.

Advantages of the Invention

The drive control device of the present invention for the hybrid vehicle is configured to control the operating state of the above-described clutch during cranking of the above-described engine to raise its speed for starting the engine. Accordingly, it is possible to reduce resonance of a drive line extending from the engine to the first electric motor connected to the differential device through a torsional damper, which resonance is generated due to a rotary motion pulsation of the engine, and therefore possible to effectively reduce generation of vibrations of the drive line during cranking of the engine.

In one preferred form of the invention, (e) the operating state of the above-described clutch is switched so as to increase a difference between a first dwelling speed to be established in a first half period of a rise of a speed of the above-described engine, and a predetermined first resonance speed of a drive line extending from the above-described engine to the first electric motor connected to the above-described first differential mechanism through a torsional damper, which predetermined first resonance speed corresponds to an explosion 1-order frequency of the above-described engine. According to this form of the invention in which the operating state of the above-described clutch is controlled so as to increase the above-indicated difference in the first half period of the rise of the engine speed, a rate of rise of the engine speed above the first resonance speed is increased so that the engine speed can be rapidly raised through a resonance band, whereby it is possible to avoid generation of resonance of the drive line, and consequently reduce generation of noises and vibrations of the drive line.

In another preferred form of the invention, (f) the operating state of the above-described clutch is switched so as to increase a difference between a second dwelling speed to be established in a second half period of a rise of a speed of the above-described engine, and a predetermined second resonance speed of a drive line extending from the above-described engine to the first electric motor connected to the above-described first differential mechanism through a torsional damper, which predetermined second resonance speed corresponds to a revolution 0.5-order pulsation frequency of the above-described engine. According to this form of the invention in which the operating state of the above-described clutch is controlled so as to increase the above-indicated difference in the second half period of the rise of the engine speed, it is possible to avoid a rise of the engine speed to or above the second resonance speed, so that it is possible to avoid generation of resonance of the drive line, and consequently reduce generation of noises and vibrations of the drive line.

In a further preferred form of the invention, each of the above-described first and second dwelling speeds is calculated on the basis of a temperature of the above-described engine and a predetermined relationship. According to this form of the invention, the first and second dwelling speeds which vary with a change of the temperature of the engine can be obtained with a high degree of accuracy, so that the resonance of the drive line can be avoided with a high degree of accuracy, whereby the generation of the noises and vibrations can be effectively reduced.

In a still further preferred form of the invention, the above-described engine is started while the hybrid vehicle is held stationary, and while the above-described output rotary member is locked by a parking mechanism to inhibit a rotary motion of the output rotary member. According to this form of the invention, the parking mechanism receives a reaction force generated during a rise of the engine speed with the first electric motor, assuring an advantage that a change of the operating state of the clutch does not cause a change of a drive force of the hybrid vehicle.

In a yet further preferred form of the invention, an inertia of a rotor of the above-described second electric motor is added to an inertia of the above-described drive line when the above-described clutch is placed in an engaged state, so that a first resonance speed or a second resonance speed of the above-described drive line is lowered, and the inertial of the rotor of the above-described second electric motor is subtracted from the above-described drive line when the above-described clutch is placed in a released state, so that the first resonance speed or second resonance speed of the above-described drive line is raised.

In another preferred form of the invention, the above-described first differential mechanism is provided with a first rotary element connected to the above-described first electric motor, a second rotary element connected to the above-described engine, and a third rotary element connected to the above-described output rotary member, while the above-described second differential mechanism is provided with a first rotary element connected to the above-described second electric motor, a second rotary element, and a third rotary element, one of the second and third rotary elements being connected to the third rotary element of the above-described first differential mechanism, and the above-described clutch is configured to selectively connect the second rotary element of the above-described first differential mechanism, and the other of the second and third rotary elements of the above-described second differential mechanism which is not connected to the third rotary element of the above-described first differential mechanism, to each other, while the above-described brake is configured to selectively fix the other of the second and third rotary elements of the above-described second differential mechanism which is not connected to the third rotary element of the above-described first differential mechanism, to the stationary member. In the thus constructed hybrid vehicle drive system, the operating state of the above-described clutch is controlled during cranking of the engine to raise its speed for starting the engine, so that it is possible to reduce the resonance of the drive line extending from the engine to the first electric motor connected to the differential device through the torsional damper, which resonance is generated due to the rotary motion pulsation of the engine, and therefore possible to effectively reduce generation of the vibrations of the drive line during cranking of the engine.

MODE FOR CARRYING OUT THE INVENTION

Figure 1:
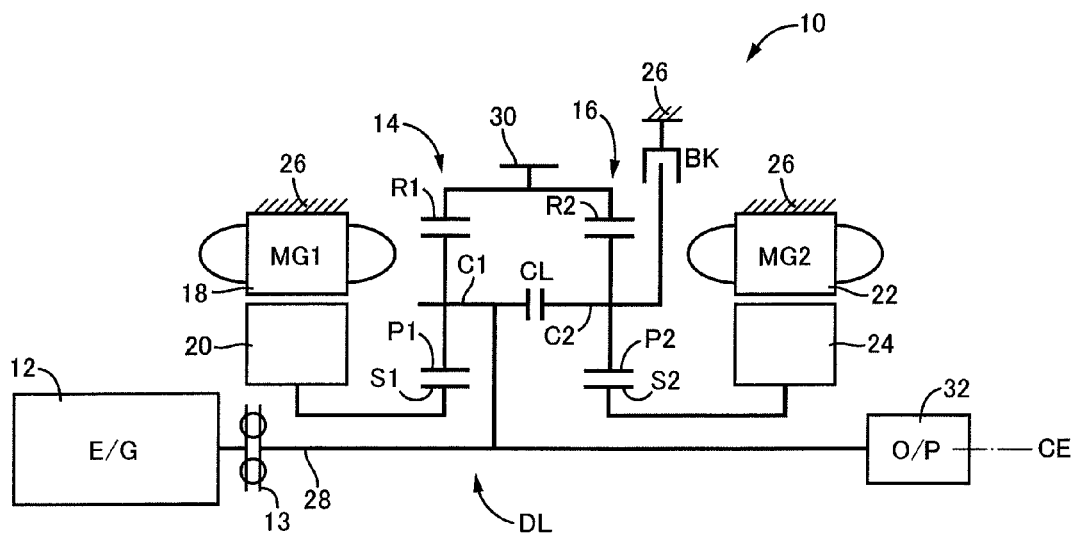
FIG. 1 is a schematic view for explaining an arrangement of a hybrid vehicle drive system to which the present invention is suitably applicable.

According to the present invention, the first and second differential mechanisms as a whole have four rotary elements while the above-described clutch is placed in the engaged state. In one preferred form of the present invention, the first and second differential mechanisms as a whole have four rotary elements while a plurality of clutches, each of which is provided between the rotary elements of the first and second differential mechanisms and which includes the above-described clutch, are placed in their engaged states. In other words, the present invention is suitably applicable to a drive control device for a hybrid vehicle which is provided with the first and second differential mechanisms represented as the four rotary elements indicated in a collinear chart, the engine, the first electric motor, the second electric motor and the output rotary member coupled to the respective four rotary elements, and wherein one of the four rotary elements is selectively connected through the above-described clutch to another of the rotary elements of the first differential mechanism and another of the rotary elements of the second differential mechanism, while the rotary element of the first or second differential mechanism to be selectively connected to the above-indicated one rotary element through the clutch is selectively fixed through the above-described brake to the stationary member.

In another preferred form of the present invention, the above-described clutch and brake are hydraulically operated coupling devices operating states (engaged and released states) of which are controlled according to a hydraulic pressure. While wet multiple-disc type frictional coupling devices are preferably used as the clutch and brake, meshing type coupling devices, namely, so-called dog clutches (claw clutches) may also be used. Alternatively, the clutch and brake may be electromagnetic clutches, magnetic powder clutches and any other clutches the operating states of which are controlled (which are engaged and released) according to electric commands.

The drive system to which the present invention is applicable is placed in a selected one of a plurality of drive modes, depending upon the operating states of the above-described clutch and brake. Preferably, EV drive modes in which at least one of the above-described first and second electric motors is used as a vehicle drive power source with the engine stopped include an EV-1 mode to be established in the engaged state of the brake and in the released state of the clutch, and an EV-2 mode to be established in the engaged states of both of the clutch and brake. Further, hybrid drive modes in which the above-described engine is operated while the above-described first and second electric motors are operated to generate a vehicle drive force and/or an electric energy as needed, include an HV-1 mode to be established in the engaged state of the brake and in the released state of the clutch, an HV-2 mode to be established in the released state of the brake and the engaged state of the clutch, and an HV-3 mode to be established in the released states of both of the brake and clutch.

In a further preferred form of the invention, the rotary elements of the above-described first differential mechanism, and the rotary elements of the above-described second differential mechanism are arranged as seen in the collinear charts, in the engaged state of the above-described clutch and in the released state of the above-described brake, in the order of the first rotary element of the first differential mechanism, the first rotary element of the second differential mechanism, the second rotary element of the first differential mechanism, the second rotary element of the second differential mechanism, the third rotary element of the first differential mechanism, and the third rotary element of the second differential mechanism, where the rotating speeds of the second rotary elements and the third rotary elements of the first and second differential mechanisms are indicated in mutually overlapping states in the collinear charts. This form of the invention provides a hybrid vehicle drive system having a highly practical arrangement.

Referring to the drawings, preferred embodiments of the present invention will be described in detail. It is to be understood that the drawings referred to below do not necessarily accurately represent ratios of dimensions of various elements.
First Embodiment FIG. 1 is the schematic view for explaining an arrangement of a hybrid vehicle drive system 10 (hereinafter referred to simply as a "drive system 10") to which the present invention is suitably applicable. As shown in FIG. 1, the drive system 10 according to the present embodiment is of a transversely installed type suitably used for an FF (front-engine front-drive) type vehicle, and is provided with a main vehicle drive power source in the form of an engine 12, a first electric motor MG1, a second electric motor MG2, a first differential mechanism in the form of a first planetary gear set 14, and a second differential mechanism in the form of a second planetary gear set 16, which are disposed on a common center axis CE. The drive system 10 is constructed substantially symmetrically with respect to the center axis CE. In FIG. 1, a lower half of the drive system 10 is not shown. This description applies to other embodiments which will be described.

The engine 12 is an internal combustion engine such as a gasoline engine, which is operable to generate a drive force by combustion of a fuel such as a gasoline injected into its cylinders. The engine 12 is connected to a carrier C1 of the first planetary gear set 14 through a torsional damper device 13 which is provided to absorb a pulsation of an output torque of the engine 12. Each of the first electric motor MG1 and second electric motor MG2 is a so-called motor/generator having a function of a motor operable to generate a drive force, and a function of an electric generator operable to generate a reaction force, and is provided with a stator 18, 22 fixed to a stationary member in the form of a housing (casing) 26, and a rotor 20, 24 disposed radially inwardly of the stator 18, 22.

The first planetary gear set 14 is a single-pinion type planetary gear set which has a gear ratio ρ1 and which is provided with rotary elements (elements) consisting of: a first rotary element in the form of a sun gear S1; a second rotary element in the form of the carrier C1 supporting a pinion gear P1 such that the pinion gear P1 is rotatable about its axis and the axis of the planetary gear set; and a third rotary element in the form of a ring gear R1 meshing with the sun gear S1 through the pinion gear P1. The second planetary gear set 16 is a single-pinion type planetary gear set which has a gear ratio ρ2 and which is provided with rotary elements (elements) consisting of: a first rotary element in the form of a sun gear S2; a second rotary element in the form of a carrier C2 supporting a pinion gear P2 such that the pinion gear P2 is rotatable about its axis and the axis of the planetary gear set; and a third rotary element in the form of a ring gear R2 meshing with the sun gear S2 through the pinion gear P2.

The sun gear S1 of the first planetary gear set 14 is connected to the rotor 20 of the first electric motor MG1. The carrier C1 of the first planetary gear set 14 is connected to an input shaft 28 which is rotated integrally with a crankshaft of the engine 12. This input shaft 28 is rotated about the center axis CE. In the following description, the direction of extension of this center axis CE will be referred to as an "axial direction", unless otherwise specified. The ring gear R1 of the first planetary gear set 14 is connected to an output rotary member in the form of an output gear 30, and to the ring gear R2 of the second planetary gear set 16. The sun gear S2 of the second planetary gear set 16 is connected to the rotor 24 of the second electric motor MG2.

The drive force received by the output gear 30 is transmitted to a pair of left and right drive wheels (not shown) through a differential gear device not shown and axles not shown. On the other hand, a torque received by the drive wheels from a roadway surface on which the vehicle is running is transmitted (input) to the output gear 30 through the differential gear device and axles, and to the drive system 10. A mechanical oil pump 32, which is a vane pump, for instance, is connected to one of opposite end portions of the input shaft 28, which one end portion is remote from the engine 12. The oil pump 32 is operated by the engine 12, to generate a hydraulic pressure to be applied to a hydraulic control unit 60, etc. which will be described.

Between the carrier C1 of the first planetary gear set 14 and the carrier C2 of the second planetary gear set 16, there is disposed a clutch CL which is configured to selectively couple these carriers C1 and C2 to each other (to selectively connect the carriers C1 and C2 to each other or disconnect the carriers C1 and C2 from each other). Between the carrier C2 of the second planetary gear set 16 and the stationary member in the form of the housing 26, there is disposed a brake BK which is configured to selectively couple (fix) the carrier C2 to the housing 26. Each of these clutch CL and brake BK is a hydraulically operated coupling device the operating state of which is controlled (which is engaged and released) according to the hydraulic pressure applied thereto from the hydraulic control unit 60. While wet multiple-disc type frictional coupling devices are preferably used as the clutch CL and brake BK, meshing type coupling devices, namely, so-called dog clutches (claw clutches) may also be used. Alternatively, the clutch CL and brake BK may be electromagnetic clutches, magnetic powder clutches and any other clutches the operating states of which are controlled (which are engaged and released) according to electric commands generated from an electronic control device 40.

As shown in FIG. 1, the drive system 10 is configured such that the first planetary gear set 14 and second planetary gear set 16 are disposed coaxially with the input shaft 28 (disposed on the center axis CE), and opposed to each other in the axial direction of the center axis CE. Namely, the first planetary gear set 14 is disposed on one side of the second planetary gear set 16 on a side of the engine 12, in the axial direction of the center axis CE. The first electric motor MG1 is disposed on one side of the first planetary gear set 14 on the side of the engine 12, in the axial direction of the center axis CE. The second electric motor MG2 is disposed on one side of the second planetary gear set 16 which is remote from the engine 12, in the axial direction of the center axis CE. Namely, the first electric motor MG1 and second electric motor MG2 are opposed to each other in the axial direction of the center axis CE, such that the first planetary gear set 14 and second planetary gear set 16 are interposed between the first electric motor MG1 and second electric motor MG2. That is, the drive system 10 is configured such that the first electric motor MG1, first planetary gear set 14, clutch CL, second planetary gear set 16, brake BK and second electric motor MG2 are disposed coaxially with each other, in the order of description from the side of the engine 12, in the axial direction of the center axis CE.

Figure 2:
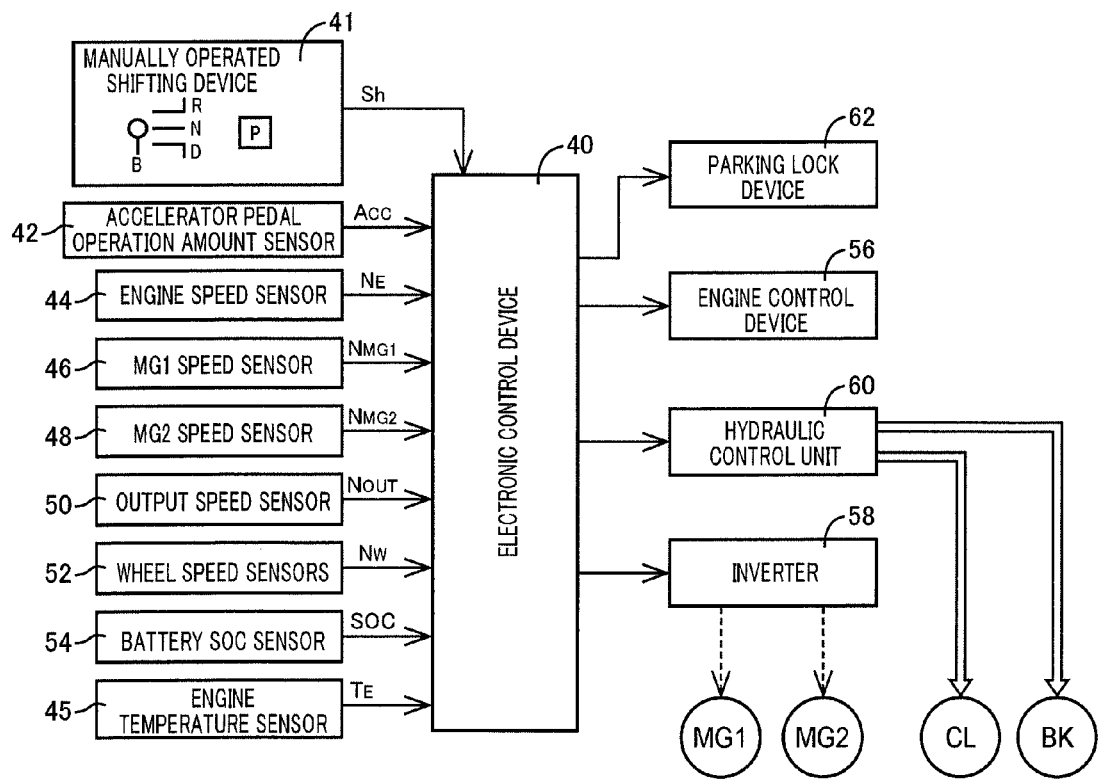
FIG. 2 is a view for explaining major portions of a control system provided to control the drive system of FIG. 1.

FIG. 2 is the view for explaining major portions of a control system provided to control the drive system 10. The electronic control device 40 shown in FIG. 2 is a so-called microcomputer which incorporates a CPU, a ROM, a RAM and an input-output interface and which is operable to perform signal processing operations according to programs stored in the ROM while utilizing a temporary data storage function of the RAM, to implement various drive controls of the drive system 10, such as a drive control of the engine 12 and hybrid drive controls of the first electric motor MG1 and second electric motor MG2. In the present embodiment, the electronic control device 40 corresponds to a drive control device for a hybrid vehicle having the drive system 10. The electronic control device 40 may be constituted by mutually independent control units as needed for respective controls such as an output control of the engine 12 and drive controls of the first electric motor MG1 and second electric motor MG2.

As indicated in FIG. 2, the electronic control device 40 is configured to receive various signals from sensors and switches provided in the drive system 10. Namely, the electronic control device 40 receives: a shift position signal Sh generated by a manually operated shifting device 41, which is indicative of a presently selected one of a parking position, a neutral position, a forward drive position, a reverse drive position, etc.; an output signal of an accelerator pedal operation amount sensor 42 indicative of an operation amount or angle $A_{CC}$ of an accelerator pedal (not shown), which corresponds to a vehicle output required by a vehicle operator; an output signal of an engine speed sensor 44 indicative of an engine speed $N_E$, that is, an operating speed of the engine 12; an output signal of an engine temperature sensor 45 indicative of a temperature $T_E$ of the engine 12, for example, a temperature of an engine cooling water; an output signal of an MG1 speed sensor 46 indicative of an operating speed $N_{MG1}$ of the first electric motor MG1; an output signal of an MG2 speed sensor 48 indicative of an operating speed $N_{MG2}$ of the second electric motor MG2; an output signal of an output speed sensor 50 indicative of a rotating speed $N_{OUT}$ of the output gear 30, which corresponds to a running speed V of the vehicle; an output signal of wheel speed sensors 52 indicative of rotating speeds $N_W$ of wheels in the drive system 10; and an output signal of a battery SOC sensor 54 indicative of a stored electric energy amount (state of charge) SOC of a battery not shown.

The electronic control device 40 is also configured to generate various control commands to be applied to various portions of the drive system 10. Namely, the electronic control device 40 applies to an engine control device 56 for controlling an output of the engine 12, following engine output control commands for controlling the output of the engine 12, which commands include: a fuel injection amount control signal to control an amount of injection of a fuel by a fuel injecting device into an intake pipe; an ignition control signal to control a timing of ignition of the engine 12 by an igniting device; and an electronic throttle valve drive control signal to control a throttle actuator for controlling an opening angle $\theta_{TH}$ of an electronic throttle valve. Further, the electronic control device 40 applies command signals to an inverter 58, for controlling operations of the first electric motor MG1 and second electric motor MG2, so that the first and second electric motors MG1 and MG2 are operated with electric energies supplied thereto from a battery through the inverter 58 according to the command signals to control outputs (output torques) of the electric motors MG1 and MG2. Electric energies generated by the first and second electric motors MG1 and MG2 are supplied to and stored in the battery through the inverter 58. Further, the electronic control device 40 applies command signals for controlling the operating states of the clutch CL and brake BK, to linear solenoid valves and other electromagnetic control valves provided in the hydraulic control unit 60, so that hydraulic pressures generated by those electromagnetic control valves are controlled to control the operating states of the clutch CL and brake BK. When the electronic control device 40 receives the shift position signal Sh indicative of the presently selected parking position, the electronic control device 40 applies to a parking lock device (parking mechanism) 62 a command signal for inhibiting a rotary motion of the output gear 30.

An operating state of the drive system 10 is controlled through the first electric motor MG1 and second electric motor MG2, such that the drive system 10 functions as an electrically controlled differential portion whose difference of input and output speeds is controllable. For example, an electric energy generated by the first electric motor MG1 is supplied to the battery or the second electric motor MG2 through the inverter 58. Namely, a major portion of the drive force of the engine 12 is mechanically transmitted to the output gear 30, while the remaining portion of the drive force is consumed by the first electric motor MG1 operating as the electric generator, and converted into the electric energy, which is supplied to the second electric motor MG2 through the inverter 58, so that the second electric motor MG2 is operated to generate a drive force to be transmitted to the output gear 30. Components associated with the generation of the electric energy and the consumption of the generated electric energy by the second electric motor MG2 constitute an electric path through which a portion of the drive force of the engine 12 is converted into an electric energy which is converted into a mechanical energy.

Figures 3, 4:
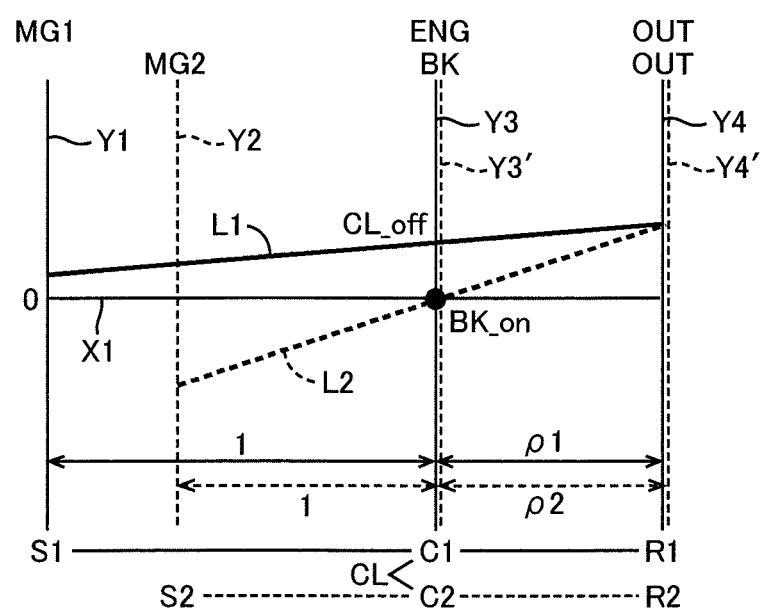
FIG. 3 is a table indicating combinations of operating states of a clutch and a brake, which correspond to respective five drive modes of the drive system of FIG. 1.
FIG. 4 is a collinear chart having straight lines which permit indication thereon of relative rotating speeds of various rotary elements of the drive system of FIG. 1, the collinear chart corresponding to the EV-1 mode and HV-1 mode of FIG. 3.

In the hybrid vehicle provided with the drive system 10 constructed as described above, one of a plurality of drive modes is selectively established according to the operating states of the engine 12, first electric motor MG1 and second electric motor MG2, and the operating states of the clutch CL and brake BK. FIG. 3 is the table indicating combinations of the operating states of the clutch CL and brake BK, which correspond to the respective five drive modes of the drive system 10. In this table, "o" marks represent an engaged state while blanks represent a released state. The EV-1 and EV-2 modes indicated in FIG. 3 are EV drive modes in which the engine 12 is held at rest while at least one of the first electric motor MG1 and second electric motor MG2 is used as a vehicle drive power source. The HV-1, HV-2 and HV-3 modes are hybrid drive modes (engine drive modes) in which the engine 12 is operated as the vehicle drive power source while the first electric motor MG1 and second electric motor MG2 are operated as needed to generate a vehicle drive force and/or an electric energy. In these hybrid drive modes, at least one of the first electric motor MG1 and second electric motor MG2 is operated to generate a reaction force or placed in a non-load free state.

As is apparent from FIG. 3, the EV drive modes of the drive system 10 in which the engine 12 is held at rest while at least one of the first electric motor MG1 and second electric motor MG2 is used as the vehicle drive power source consist of: the EV-1 mode (drive mode 1) which is established in the engaged state of the brake BK and in the released state of the clutch CL; and the EV-2 mode (drive mode 2) which is established in the engaged states of both of the brake BK and clutch CL. The hybrid drive modes in which the engine 12 is operated as the vehicle drive power source while the first electric motor MG1 and second electric motor MG2 are operated as needed to generate a vehicle drive force and/or an electric energy, consist of: the HV-1 mode (drive mode 3) which is established in the engaged state of the brake BK and in the released state of the clutch CL; the HV-2 mode (drive mode 4) which is established in the released state of the brake BK and in the engaged state of the clutch CL; and the HV-3 mode (drive mode 5) in the form of the drive mode HV-3 which is established in the released states of both of the brake BK and clutch CL.

FIGS. 4-7 are the collinear charts having straight lines which permit indication thereon of relative rotating speeds of the various rotary elements of the drive system 10 (first planetary gear set 14 and second planetary gear set 16), which rotary elements are connected to each other in different manners corresponding to respective combinations of the operating states of the clutch CL and brake BK. These collinear charts are defined in a two-dimensional coordinate system having a horizontal axis along which relative gear ratios ρ of the first and second planetary gear sets 14 and 16 are taken, and a vertical axis along which the relative rotating speeds are taken. The collinear charts indicate the relative rotating speeds when the output gear 30 is rotated in the positive direction to drive the hybrid vehicle in the forward direction. A horizontal line X1 represents the rotating speed of zero, while vertical lines Y1 through Y4 arranged in the order of description in the rightward direction represent the respective relative rotating speeds of the sun gear S1, sun gear S2, carrier C1 and ring gear R1. Namely, a solid line Y1 represents the relative rotating speed of the sun gear S1 of the first planetary gear set 14 (operating speed of the first electric motor MG1), a broken line Y2 represents the relative rotating speed of the sun gear S2 of the second planetary gear set 16 (operating speed of the second electric motor MG2), a solid line Y3 represents the relative rotating speed of the carrier C1 of the first planetary gear set 14 (operating speed of the engine 12), a broken line Y3' represents the relative rotating speed of the carrier C2 of the second planetary gear set 16, a solid line Y4 represents the relative rotating speed of the ring gear R1 of the first planetary gear set 14 (rotating speed of the output gear 30), and a broken line Y4' represents the relative rotating speed of the ring gear R2 of the second planetary gear set 16. In FIGS. 4-7, the vertical lines Y3 and Y3' are superimposed on each other, while the vertical lines Y4 and Y4' are superimposed on each other. Since the ring gears R1 and R2 are fixed to each other, the relative rotating speeds of the ring gears R1 and R2 represented by the vertical lines Y4 and Y4' are equal to each other.

In FIGS. 4-7, a solid line L1 represents the relative rotating speeds of the three rotary elements of the first planetary gear set 14, while a broken line L2 represents the relative rotating speeds of the three rotary elements of the second planetary gear set 16. Distances between the four vertical lines Y1-Y4 (Y2-Y4') corresponding to four rotary elements of the first and second planetary gear sets 14 and 16 taken as a whole are determined by the gear ratios $\rho1$ and $\rho2$ of the first and second planetary gear sets 14 and 16. Described more specifically, regarding the vertical lines Y1, Y3 and Y4 corresponding to the respective three rotary elements in the form of the sun gear S1, carrier C1 and ring gear R1 of the first planetary gear set 14, a distance between the vertical lines Y1 and Y3 corresponds to "1", while a distance between the vertical lines Y3 and Y4 corresponds to the gear ratio "$\rho1$". Regarding the vertical lines Y2, Y3' and Y4' corresponding to the respective three rotary elements in the form of the sun gear S2, carrier C2 and ring gear R2 of the second planetary gear set 16, a distance between the vertical lines Y2 and Y3' corresponds to "1", while a distance between the vertical lines Y3' and Y4' corresponds to the gear ratio "$\rho2$". In the drive system 10, the gear ratio $\rho2$ of the second planetary gear set 16 is higher than the gear ratio $\rho1$ of the first planetary gear set 14 ($\rho2>\rho1$). The drive modes of the drive system 10 will be described by reference to FIGS. 4-7.

The EV-1 mode (drive mode 1) indicated in FIG. 3 is preferably a first motor drive mode in which the engine 12 is held at rest while the second electric motor MG2 is used as the vehicle drive power source. FIG. 4 is the collinear chart corresponding to this EV-1 mode. Described by reference to this collinear chart, the carrier C1 of the first planetary gear set 14 and the carrier C2 of the second planetary gear set 16 are rotatable relative to each other in the released state of the clutch CL. In the engaged state of the brake BK, the carrier C2 of the second planetary gear set 16 is coupled (fixed) to the stationary member in the form of the housing 26, so that the rotating speed of the carrier C2 is held zero. In this EV-1 mode, the rotating direction of the sun gear S2 and the rotating direction of the ring gear R2 in the second planetary gear set 16 are opposite to each other, so that when the second electric motor MG2 is operated to generate a negative torque (acting in the negative direction), the ring gear R2, that is, the output gear 30 is rotated in the positive direction by the generated negative torque. Namely, the hybrid vehicle provided with the drive system 10 is driven in the forward direction when the negative torque is generated by the second electric motor MG2. In this case, the first electric motor MG1 is preferably held in a free state. In this EV-1 mode, the carriers C1 and C2 are permitted to be rotated relative to each other, so that the hybrid vehicle can be driven in the EV drive mode in which running using the second electric motor MG2 in forward and backward direction can be performed, similar to an EV (electric) drive mode which is established in a vehicle provided with a so-called "THS" (Toyota Hybrid System) and in which the carrier C2 is fixed to the stationary member.

Figure 5:
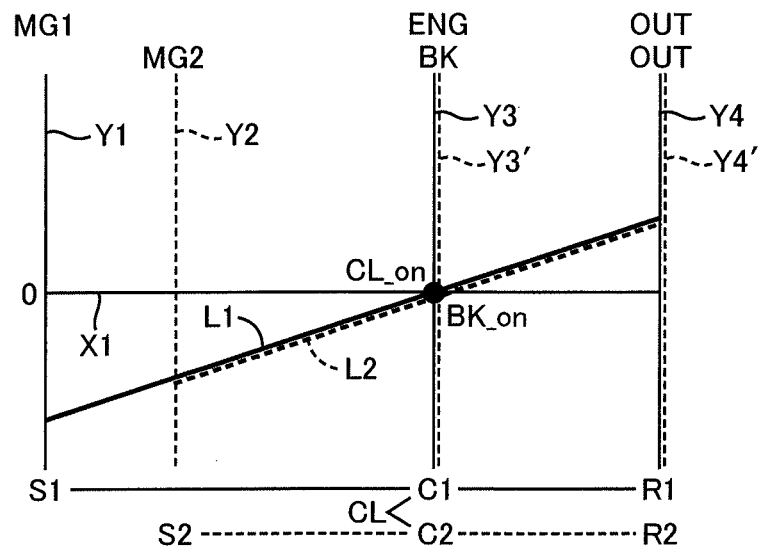
FIG. 5 is a collinear chart having straight lines which permit indication thereon of relative rotating speeds of various rotary elements of the drive system of FIG. 1, the collinear chart corresponding to the EV-2 mode of FIG. 3.

The EV-2 mode (drive mode 2) indicated in FIG. 3 is preferably a second motor drive mode in which the engine 12 is held at rest while at least one of the first electric motor MG1 and second electric motor MG2 is used as the vehicle drive power source. FIG. 5 is the collinear chart corresponding to this EV-2 mode. Described by reference to this collinear chart, the carrier C1 of the first planetary gear set 14 and the carrier C2 of the second planetary gear set 16 are not rotatable relative to each other in the engaged state of the clutch CL. Further, in the engaged state of the brake BK, the carrier C2 of the second planetary gear set 16 and the carrier C1 of the first planetary gear set 14 which is connected to the carrier C2 are coupled (fixed) to the stationary member in the form of the housing 26, so that the rotating speeds of the carriers C1 and C2 are held zero. In this EV-2 mode, the rotating direction of the sun gear S1 and the rotating direction of the ring gear R1 in the first planetary gear set 14 are opposite to each other, and the rotating direction of the sun gear S2 and the rotating direction of the ring gear R2 in the second planetary gear set 16 are opposite to each other, so that when the first electric motor MG1 and/or second electric motor MG2 is/are operated to generate a negative torque (acting in the negative direction), the ring gears R1 and R2 are rotated, that is, the output gear 30 is rotated in the positive direction by the generated negative torque. Namely, the hybrid vehicle provided with the drive system 10 can be driven in the forward or reverse direction by at least one of the first electric motor MG1 and second electric motor MG2.

In the EV-2 mode, at least one of the first electric motor MG1 and second electric motor MG2 may be operated as the electric generator. In this case, one or both of the first and second electric motors MG1 and MG2 may be operated to generate a vehicle drive force (torque), at an operating point assuring a relatively high degree of operating efficiency, and/or with a reduced degree of torque limitation due to heat generation. Further, at least one of the first and second electric motors MG1 and MG2 may be held in a free state, when the generation of an electric energy by a regenerative operation of the electric motors MG1 and MG2 is inhibited due to full charging of the battery. Namely, the EV-2 mode is an EV drive mode which may be established under various running conditions of the hybrid vehicle, or may be kept for a relatively long length of time. Accordingly, the EV-2 mode is advantageously provided on a hybrid vehicle such as a plug-in hybrid vehicle, which is frequently placed in an EV drive mode.

The HV-1 mode (drive mode 3) indicated in FIG. 3 is preferably a first hybrid drive mode (first engine drive mode) in which the engine 12 is used as the vehicle drive power source while the first electric motor MG1 and second electric motor MG2 are operated as needed to generate a vehicle drive force and/or an electric energy. FIG. 4 is the collinear chart corresponding to this HV-1 mode. Described by reference to this collinear chart, the carrier C1 of the first planetary gear set 14 and the carrier C2 of the second planetary gear set 16 are rotatable relative to each other, in the released state of the clutch CL. In the engaged state of the brake BK, the carrier C2 of the second planetary gear set 16 is coupled (fixed) to the stationary member in the form of the housing 26, so that the rotating speed of the carrier C2 is held zero. In this HV-1 mode, the engine 12 is operated to generate an output torque by which the output gear 30 is rotated. At this time, the first electric motor MG1 is operated to generate a reaction torque in the first planetary gear set 14, so that the output of the engine 12 can be transmitted to the output gear 30. In the second planetary gear set 16, the rotating direction of the sun gear S2 and the rotating direction of the ring gear R2 are opposite to each other, in the engaged state of the brake BK, so that when the second electric motor MG2 is operated to generate a negative torque (acting in the negative direction), the ring gears R1 and R2 are rotated, that is, the output gear 30 is rotated in the positive direction by the generated negative torque.

Figure 6:
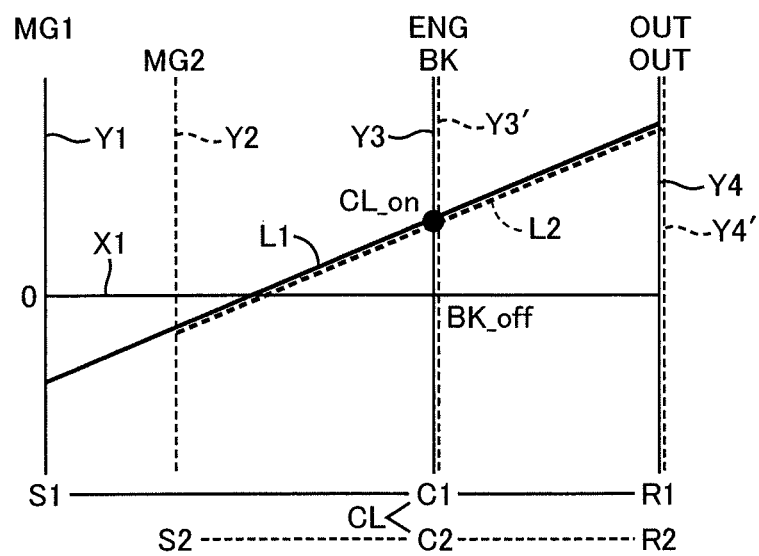
FIG. 6 is a collinear chart having straight lines which permit indication thereon of relative rotating speeds of various rotary elements of the drive system of FIG. 1, the collinear chart corresponding to the HV-2 mode of FIG. 3.

The HV-2 mode (drive mode 4) indicated in FIG. 3 is preferably a second hybrid drive mode (second engine drive mode) in which the engine 12 is used as the vehicle drive power source while the first electric motor MG1 and second electric motor MG2 are operated as needed to generate a vehicle drive force and/or an electric energy. FIG. 6 is the collinear chart corresponding to this HV-2 mode. Described by reference to this collinear chart, the carrier C1 of the first planetary gear set 14 and the carrier C2 of the second planetary gear set 16 are not rotatable relative to each other, in the engaged state of the clutch CL, that is, the carriers C1 and C2 are integrally rotated as a single rotary element. The ring gears R1 and R2, which are fixed to each other, are integrally rotated as a single rotary element. Namely, in the HV-2 mode of the drive system 10, the first planetary gear set 14 and second planetary gear set 16 function as a differential mechanism having a total of four rotary elements. That is, the HV-2 mode is a composite split mode in which the four rotary elements consisting of the sun gear S1 (connected to the first electric motor MG1), the sun gear S2 (connected to the second electric motor MG2), the rotary element constituted by the carriers C1 and C2 connected to each other (and to the engine 12), and the rotary element constituted by the ring gears R1 and R2 fixed to each other (and connected to the output gear 30) are connected to each other in the order of description in the rightward direction as seen in FIG. 6.

In the HV-2 mode, the rotary elements of the first planetary gear set 14 and second planetary gear set 16 are preferably arranged as indicated in the collinear chart of FIG. 6, that is, in the order of the sun gear S1 represented by the vertical line Y1, the sun gear S2 represented by the vertical line Y2, the carriers C1 and C2 represented by the vertical line Y3 (Y3'), and the ring gears R1 and R2 represented by the vertical line Y4 (Y4'). The gear ratios ρ1 and ρ2 of the first and second planetary gear sets 14 and 16 are determined such that the vertical line Y1 corresponding to the sun gear S1 and the vertical line Y2 corresponding to the sun gear S2 are positioned as indicated in the collinear chart of FIG. 6, namely, such that the distance between the vertical lines Y1 and Y3 is longer than the distance between the vertical lines Y2 and Y3'. In other words, the distance between the vertical lines corresponding to the sun gear S1 and the carrier C1 and the distance between the vertical lines corresponding to the sun gear S2 and the carrier C2 correspond to "1", while the distance between the vertical lines corresponding to the carrier C1 and the ring gear R1 and the distance between the vertical lines corresponding to the carrier C2 and the ring gear R2 correspond to the respective gear ratios ρ1 and ρ2. Accordingly, the drive system 10 is configured such that the gear ratio ρ2 of the second planetary gear set 16 is higher than the gear ratio ρ1 of the first planetary gear set 14.

In the HV-2 mode, the carrier C1 of the first planetary gear set 14 and the carrier C2 of the second planetary gear set 16 are connected to each other in the engaged state of the clutch CL, so that the carriers C1 and C2 are rotated integrally with each other. Accordingly, either one or both of the first electric motor MG1 and second electric motor MG2 can receive a reaction force corresponding to the output of the engine 12. Namely, one or both of the first and second electric motors MG1 and MG2 can be operated to receive the reaction force during an operation of the engine 12, so that each of the first and second electric motors MG1 and MG2 can be operated at an operating point assuring a relatively high degree of operating efficiency, and/or with a reduced degree of torque limitation due to heat generation. For example, one of the first electric motor MG1 and second electric motor MG2 which is operable with a higher degree of operating efficiency is preferentially operated to generate a reaction force, so that the overall operating efficiency can be improved. Further, where there is a torque limitation of one of the first electric motor MG1 and second electric motor MG2 due to heat generation, it is possible to ensure the generation of the reaction force required for the engine 12, by controlling the other electric motor so as to perform a regenerative operation or a vehicle driving operation, for providing an assisting vehicle driving force.

Figure 7:
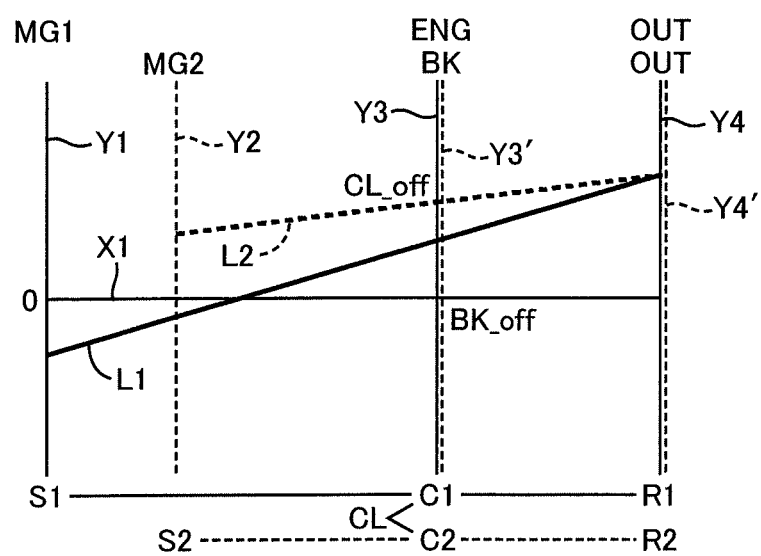
FIG. 7 is a collinear chart having straight lines which permit indication thereon of relative rotating speeds of various rotary elements of the drive system of FIG. 1, the collinear chart corresponding to the HV-3 mode of FIG. 3.

The HV-3 mode (drive mode 5) indicated in FIG. 3 is preferably a third hybrid drive mode (third engine drive mode) in which the engine 12 is operated as the vehicle drive power source while the first electric motor MG1 is operated to generate an electric energy, with a continuous change of the speed ratio, and with an operating point of the engine 12 being moved along a predetermined optimum operating curve. In this HV-3 mode, the engine 12 and first electric motor MG1 may be operated to generate a vehicle drive force, with the second electric motor MG2 being disconnected from a drive system. FIG. 7 is the collinear chart corresponding to this HV-3 mode. Described by reference to this collinear chart, the carrier C1 of the first planetary gear set 14 and the carrier C2 of the second planetary gear set 16 are rotatable relative to each other in the released state of the clutch CL. In the released state of the brake BK, the carrier C2 of the second planetary gear set 16 is rotatable relative to the stationary member in the form of the housing 26. In this arrangement, the second electric motor MG2 can be held at rest while it is disconnected from the drive system (power transmitting path).

In the HV-3 mode in which the brake BK is placed in the engaged state, the second electric motor MG2 is kept in an operated state together with a rotary motion of the output gear 30 (ring gear R2) during running of the vehicle. In this operating state, the operating speed of the second electric motor MG2 may reach an upper limit value (upper limit) during running of the vehicle at a comparatively high speed, or a rotating speed of the ring gear R2 is transmitted to the sun gear S2 with the rotational speed increased. In this respect, it is not necessarily desirable to keep the second electric motor MG2 in the operated state during running of the vehicle at a comparatively high speed, from the standpoint of the operating efficiency. In the HV-3 mode, on the other hand, the engine 12 and the first electric motor MG1 may be operated to generate the vehicle drive force during running of the vehicle at the comparatively high speed, while the second electric motor MG2 is disconnected from the drive system, so that it is possible to reduce a power loss due to dragging of the unnecessarily operated second electric motor MG2, and to eliminate a limitation of the highest vehicle running speed corresponding to the permissible highest operating speed (upper limit of the operating speed) of the second electric motor MG2.

It will be understood from the foregoing description, the drive system 10 is selectively placed in one of the three hybrid drive modes in which the engine 12 is operated as the vehicle drive power source while the first and second electric motors MG1 and MG2 are operated as needed to generate a vehicle drive force and/or an electric energy, namely, in one of the HV-1 mode, HV-2 mode and HV-3 mode, which are selectively established by respective combinations of the engaged and released states of the clutch CL and brake BK. Accordingly, the transmission efficiency can be improved to improve the fuel economy of the vehicle, by selectively establishing one of the three hybrid drive modes according to the vehicle running speed and the speed ratio, in which the transmission efficiency is the highest.

Figure 8:
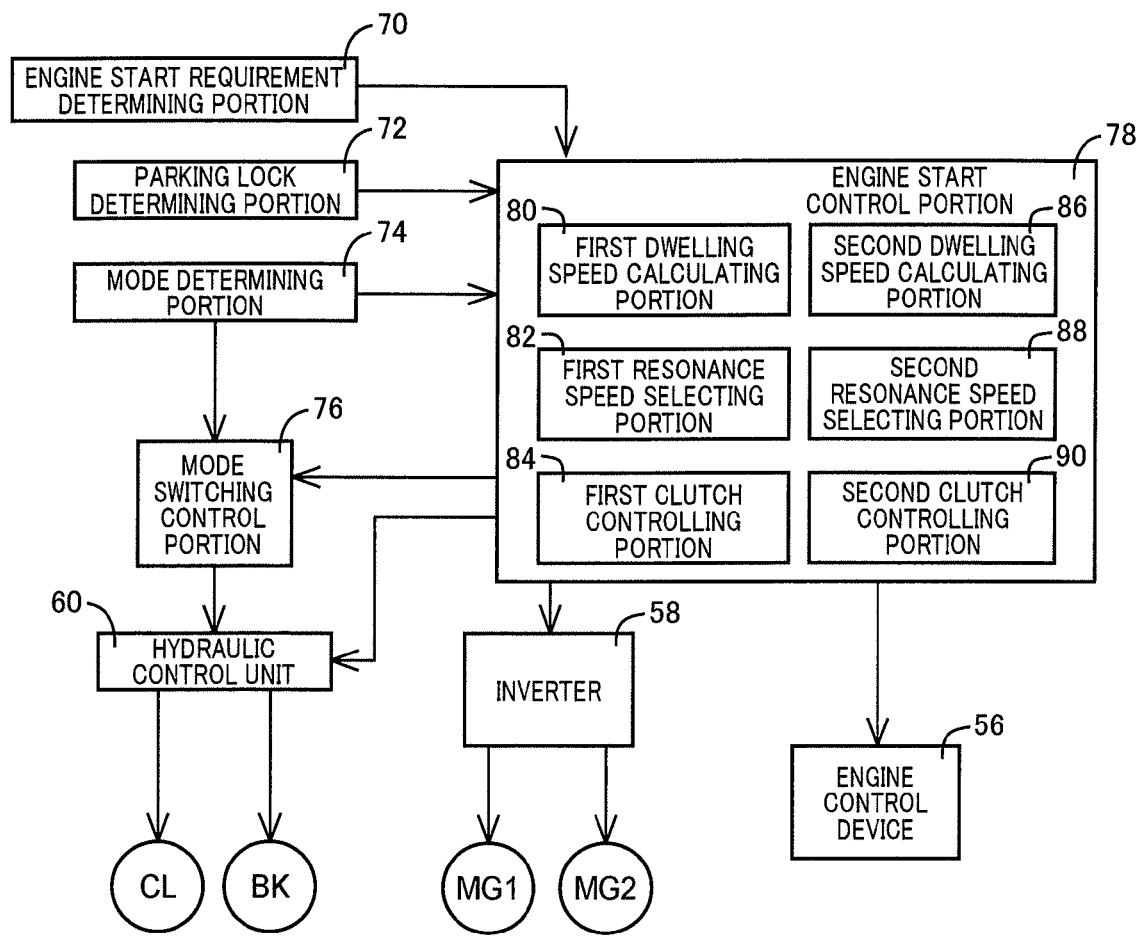
FIG. 8 is a functional block diagram for explaining major control functions of an electronic control device of FIG. 2.

FIG. 8 is the functional block diagram for explaining major control functions of the electronic control device 40 of FIG. 2. An engine start requirement determining portion 70 shown in FIG. 8 is configured to determine whether the engine 12 which has been kept at rest (without a fuel injection and ignition under the control of the engine control device 56) is required to be started. For instance, the engine start requirement determining portion 70 determines that the engine 12 is required to be started, if an electric-energy storage device not shown is insufficiently charged with its stored electric energy amount SOC being smaller than a lower limit, if a drive mode selector device not shown is operated to an engine drive position, or if a running state of the hybrid vehicle falls within an engine drive region, as a result of an increase of a required vehicle drive force represented by the accelerator pedal operation amount and the vehicle running speed, above a predetermined upper limit.

A parking lock determining portion 72 is configured to determine whether the output gear 30 is locked by the parking lock device 62 to inhibit a rotary motion of the output gear 30, with the manually operated shifting device 41 being placed in the parking position. For instance, this determination is made by determining whether a parking lock command has been generated from the parking lock device 62. A mode determining portion 74 is configured to determine a presently established one of the five modes consisting of the EV-1, EV-2, HV-1, HV-2 and HV-3 modes, on the basis of vehicle parameters such as the vehicle running speed V, the accelerator pedal operation amount $A_{CC}$, the stored electric energy amount SOC and operating temperatures, or on the basis of output states of the engine control device 56 and the inverter 58, an output state of a mode switching control portion 76, or an already set state of an appropriate memory flag.

The mode switching control portion 76 is configured to implement a mode switching control for placing the drive system 10 in the selected one of the drive modes. For instance, the mode switching control portion 76 determines whether the drive system 10 should be placed in an electric drive mode or a hybrid drive mode, depending upon whether the operator's required vehicle drive force represented by the vehicle running speed V and the accelerator pedal operation amount $A_{CC}$ lies in a predetermined electric drive region or an engine drive region, or on the basis of a requirement based on the stored electric energy amount SOC. If the electric drive mode is selected or required, the mode switching control portion 76 establishes one of the drive EV-1 and EV-2 modes, on the basis of the requirement based on the stored electric energy amount SOC and the operator's selection. If the hybrid drive mode is selected or required, the mode switching control portion 76 establishes one of the HV-1, HV-2 and HV-3 modes, on the basis of the operating efficiency of the engine 12, the transmission efficiency, the required vehicle drive force, etc., so as to provide a good compromise between the vehicle drivability and the fuel economy. For example, the mode switching control portion 76 establishes the HV-1 mode at a relatively low running speed in a relatively low-gear (high speed-reduction ratio range), the HV-2 mode at a relatively intermediate running speed in a relatively intermediate-gear (intermediate speed-reduction ratio range), or at a relatively high running speed in a relatively high-gear (low speed-reduction ratio range). This mode switching control portion 76 releases the clutch CL and engages the brake BK through the hydraulic control unit 60, for switching the drive mode from the HV-2 mode to the HV-1 mode. Namely, the mode switching control portion 76 switches the operating state from the state shown in the collinear chart of FIG. 6 to the state shown in the collinear chart of FIG. 4.

An engine start control portion 78 is configured to command the engine control device 56 to initiate an operation of the first electric motor MG1 to raise the rotating speed of the crankshaft of the engine 12, that is, the engine speed $N_E$, and to initiate a fuel supply into an intake pipe of the engine 12, and an ignition control of the engine 12, when the engine start requirement determining portion 70 determines that the engine is required to be started and when the parking lock determining portion 72 determines that the hybrid vehicle is in a parked state with the output gear 30 being mechanically locked. At the same time, the engine start control portion 78 places the brake BK in the released state, and controls the operating state of the clutch CL so as to reduce vibrations (resonance) of a drive line DL extending from the engine 12 to the first electric motor MG1 connected to the sun gear S1 of the first planetary gear set (differential mechanism) 14 through the torsional damper device 13, which vibrations are generated during cranking of the engine by the first electric motor MG1 to raise the engine speed $N_E$.

Figure 9:
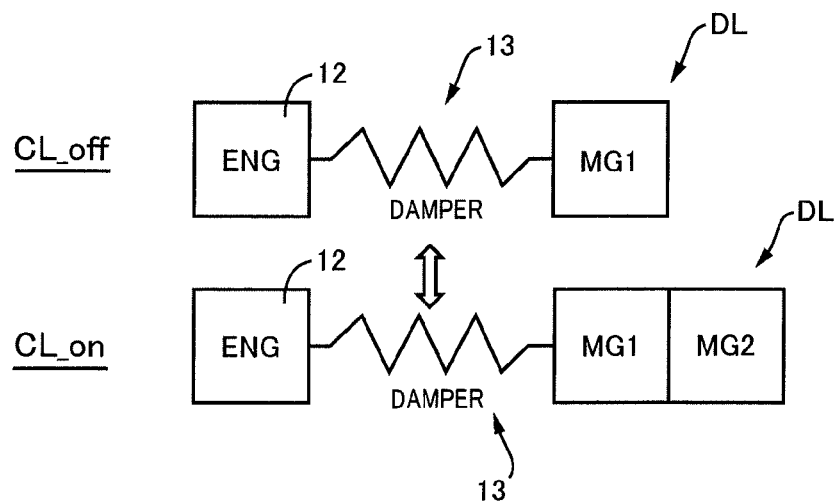
FIG. 9 is an illustrative view for explaining an arrangement of a drive line extending from an engine to a first electric motor, and indicating states of the drive line in respective released and engaged states of the clutch controlled by an engine start control portion of FIG. 8.
Figure 10:
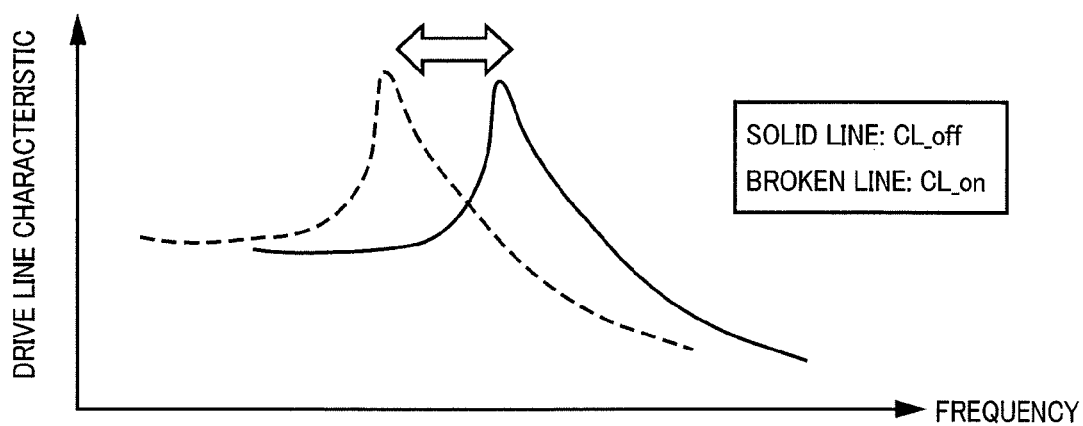
FIG. 10 is a view indicating resonance characteristics of the drive line in the released and engaged states of the clutch indicated in FIG. 9.
Figure 11:
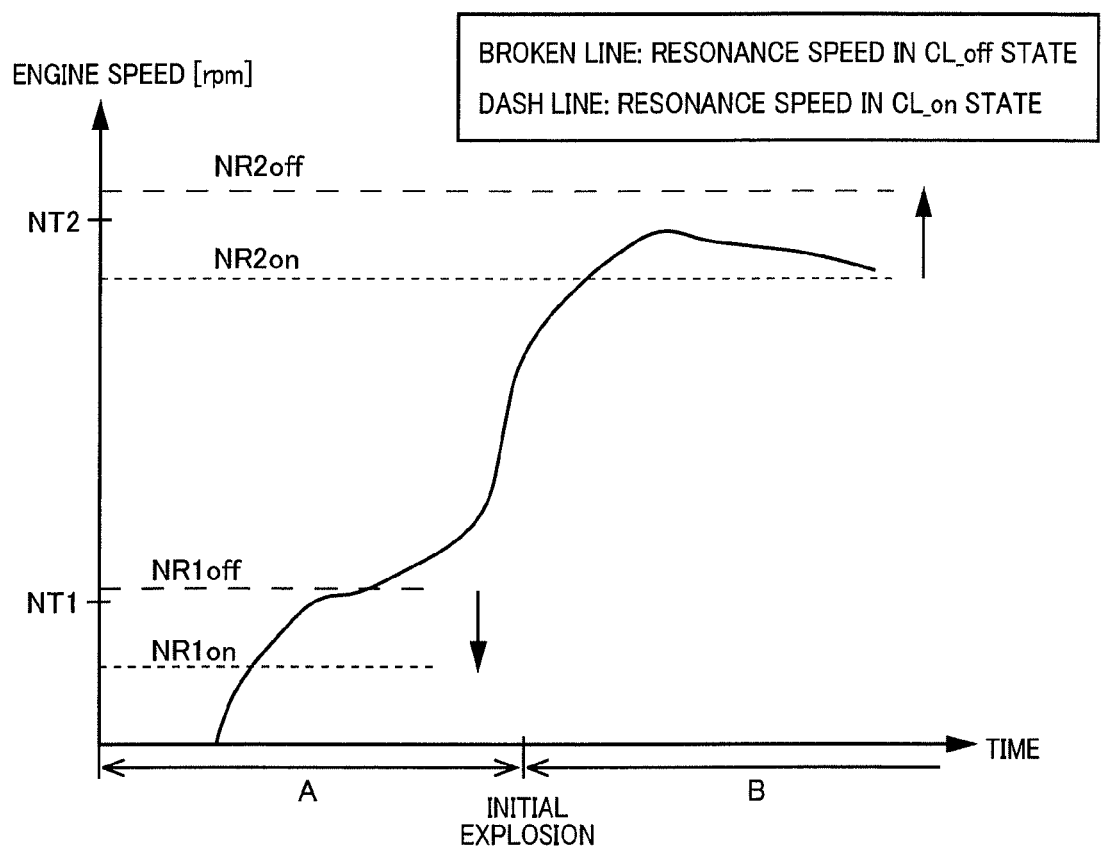
FIG. 11 is a view for explaining characteristics of a rise of a speed of the engine raised under the control of the engine start control portion of FIG. 8, together with resonance speeds of the drive line in the respective released and engaged states of the clutch.

FIG. 9 shows, as an equivalent torsional vibration system, the drive line DL extending from the engine 12 to the first electric motor MG1 connected to the sun gear S1 of the first planetary gear set (differential mechanism) 14 through the torsional damper device 13, when the parking position is selected. When the clutch CL is placed in the released state, the second electric motor MG2 is not connected to the vibration system, as indicated in an upper part of FIG. 9. When the clutch CL is placed in the engaged state, an inertia of the rotor of the second electric motor MG2 is input to the vibration system through its right end, as indicated in a lower part of FIG. 9. If the vibration system indicated in the upper part of FIG. 9 exhibits a vibration characteristic indicated by a solid line in FIG. 10, the vibration system indicated in the lower part of FIG. 9 exhibits a vibration characteristic indicated by a broken line in FIG. 10, wherein the frequency at which the vibration has a peak amplitude, namely, a resonance point, is lowered with respect to the former vibration system. Where the vibration system when the clutch CL is placed in the released state as indicated in the upper part of FIG. 9 has a resonance frequency of about 13 Hz, the vibration system when the clutch CL is placed in the engaged state as indicated in the lower part of FIG. 9 has a resonance frequency of about 10 Hz. The resonance frequencies of 10 Hz and 13 Hz are respectively converted into equivalent resonance speeds NR1on and NR1off of 300 rpm and 390 rpm in relation to an explosion 1-order pulsation of a 4-cycle 4-cylinder engine, and equivalent resonance speeds NR2on and NR2off of 1200 rpm and 1560 rpm in relation to an explosion 0.5-order pulsation of the 4-cycle 4-cylinder engine.

The engine speed $N_E$ which is raised by the first electric motor MG1 for starting the 4-cycle 4-cylinder engine tends to have a first dwelling speed NT1 of about 300 rpm, for example, around which the engine speed $N_E$ dwells with a low rate of rise in a first half period A up to a moment of the initial explosion, and a second dwelling speed NT2 of about 1200 rpm, for example, around which the engine speed $N_E$ dwells with a low rate of rise in a second half period B following the moment of the initial explosion. These dwelling speeds are values of the engine speed $N_E$ corresponding to respective portions of a curve indicative of a rise of the engine speed $N_E$ in which the rates of change are the lowest in the respective first and second half periods A and B, and tend to decrease with a decrease of the temperature of the engine 12 since the dwelling speeds relate to the engine friction. The engine speed $N_E$ in the first half period A up to the moment of the initial explosion includes a rotary motion pulsation of explosion 1-order frequency of the engine 12, namely, compression 1-order frequency of 180°, while the engine speed $N_E$ in the second half period B following the moment of the initial explosion includes a revolution 0.5-order pulsation due to unstable ignition. Accordingly, the drive line DL is likely to suffer from a drawback of comparatively long period of generation of vibrations and noises, since the resonance frequency of the drive line DL including the torsional damper device 13 provided to absorb the rotary motion pulsation is coincident with or close to the resonance speeds NR1 and NR2 in the first and second half periods A and B during a rise of the engine speed $N_E$ to start the engine 12, unless the operating state of the clutch CL is not controlled during the engine starting.

In view of the drawback described above, the engine start control portion 78 is designed to include: a first dwelling speed calculating portion 80 configured to calculate the first dwelling speed NT1 to be established in the first half period A during the rise of the engine speed $N_E$, on the basis of the temperature $T_E$ of the engine 12 and according to a predetermined relationship obtained by experimentation; a first resonance speed selecting portion 82 configured to select one of the predetermined first resonance speeds NR1on and NR1off of the drive line DL, on the basis of the first dwelling speed NT1 calculated by the first dwelling speed calculating portion 80 and the first resonance speeds NR1on and NR1off, such that the selected first resonance speed NR1on or NR1off provides a larger difference (NT1−NR1on) or (NT1−NR1off) with respect to the calculated first dwelling speed NT1; a first clutch controlling portion 84 configured to place the clutch CL in the engaged or released state such that the resonance speed of the drive line DL in the first half period A coincides with one of the first resonance speeds NR1on and NR1off selected by the first resonance speed selecting portion 82; a second dwelling speed calculating portion 86 configured to calculate the second dwelling speed NT2 to be established in the second half period B during the rise of the engine speed $N_E$, on the basis of the temperature $T_E$ of the engine 12 and according to a predetermined relationship obtained by experimentation; a second resonance speed selecting portion 88 configured to select one of the predetermined second resonance speeds NR2on and NR2off of the drive line DL, on the basis of the second dwelling speed NT2 calculated by the second dwelling speed calculating portion 86 and the second resonance speeds NR2on and NR2off, such that the selected second resonance speed NR2on or NR2off provides a larger difference (NT2−NR2on) or (NT2−NR2off) with respect to the calculated second dwelling speed NT2; and a second clutch controlling portion 90 configured to place the clutch CL in the engaged or released state such that the resonance speed of the drive line DL in the second half period B coincides with one of the second resonance speeds NR2on and NR2off selected by the second resonance speed selecting portion 88.

Figure 12:
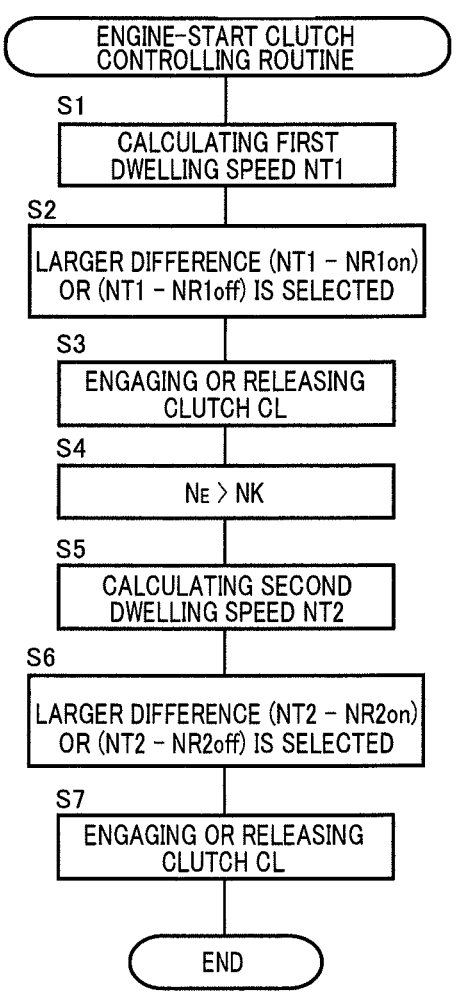
FIG. 12 is a flow chart for explaining a clutch switching control implemented by the engine start control portion of FIG. 8 during starting of the engine.
Figure 13:
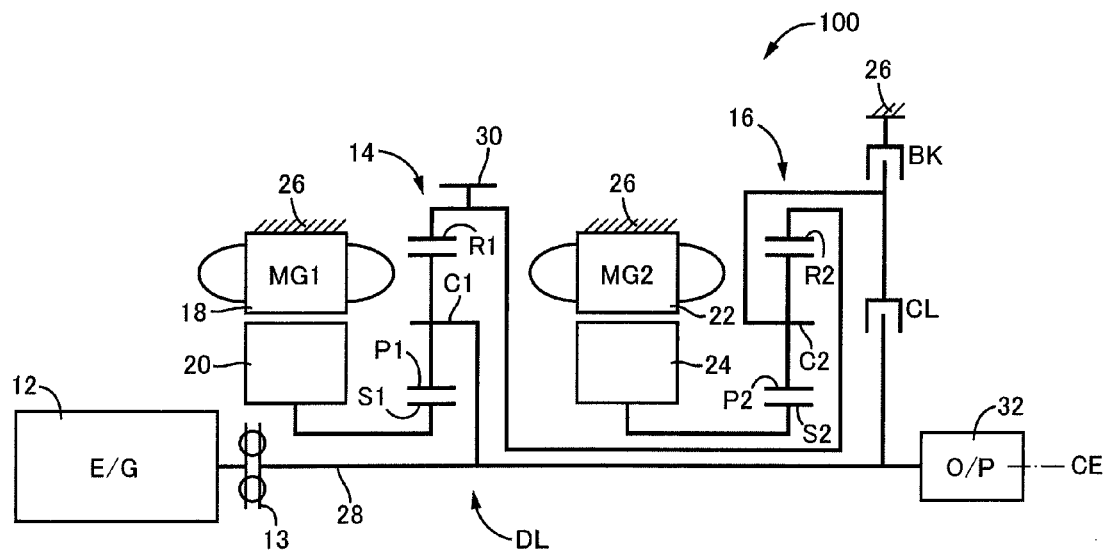
FIG. 13 is a schematic view for explaining an arrangement of a hybrid vehicle drive system according to another preferred embodiment of this invention.
Figure 14:
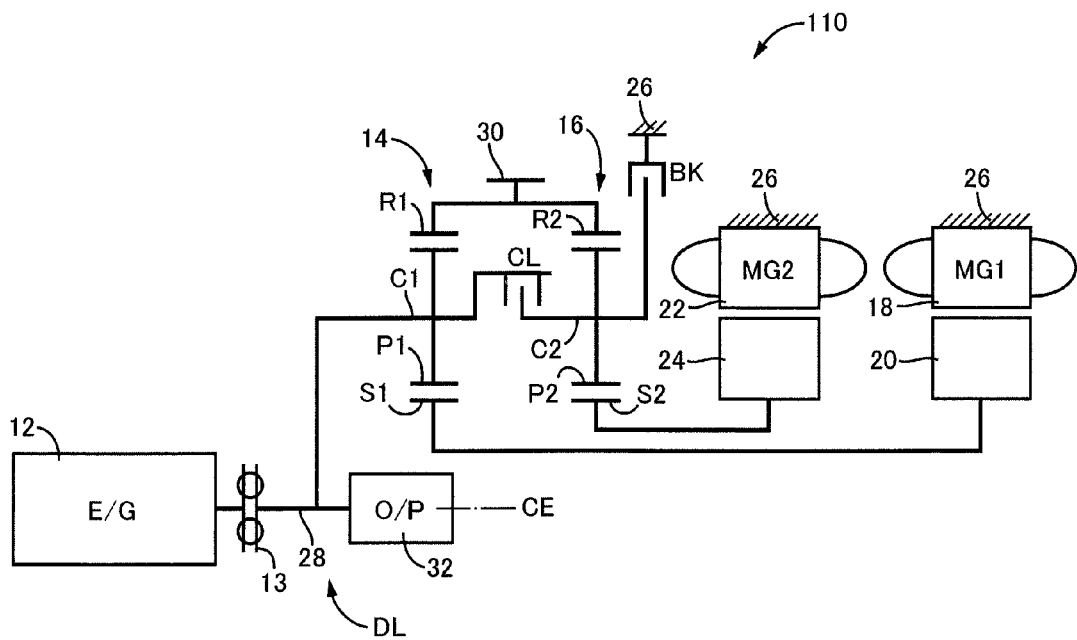
FIG. 14 is a schematic view for explaining an arrangement of a hybrid vehicle drive system according to a further preferred embodiment of this invention.
Figure 15:
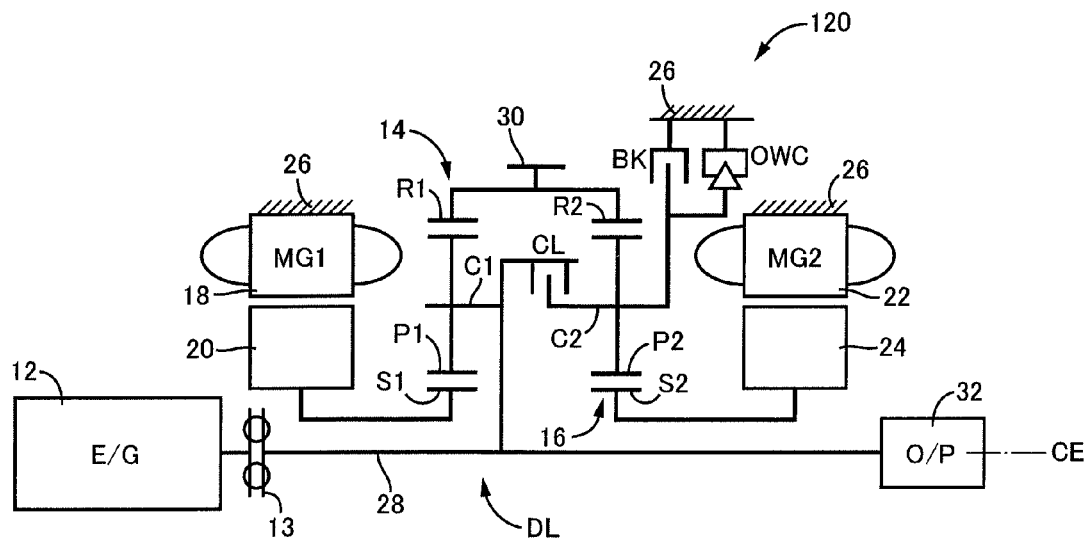
FIG. 15 is a schematic view for explaining an arrangement of a hybrid vehicle drive system according to a still further preferred embodiment of this invention.
Figure 16:
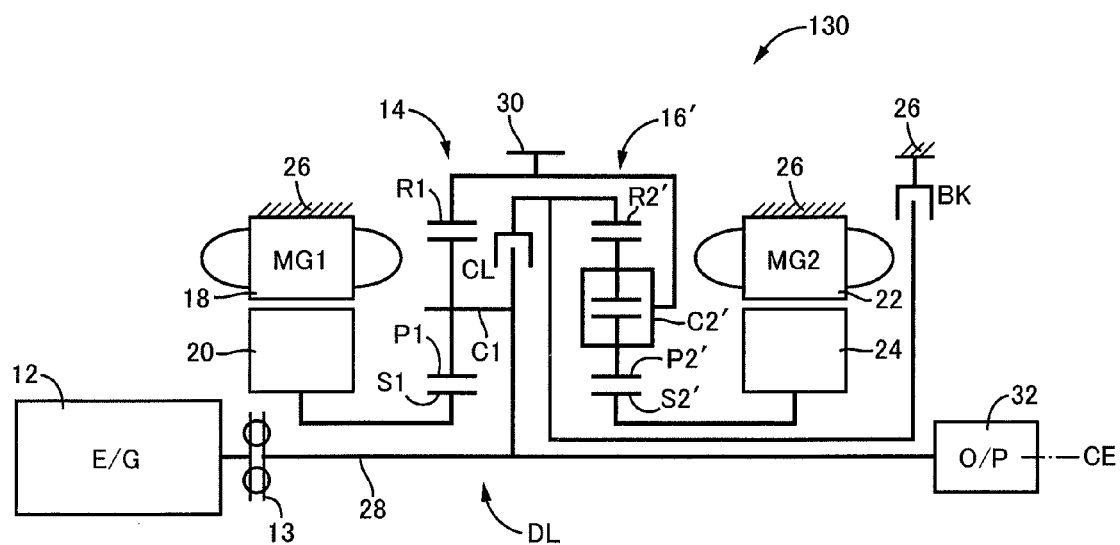
FIG. 16 is a schematic view for explaining an arrangement of a hybrid vehicle drive system according to a yet further preferred embodiment of this invention.
Figure 17:
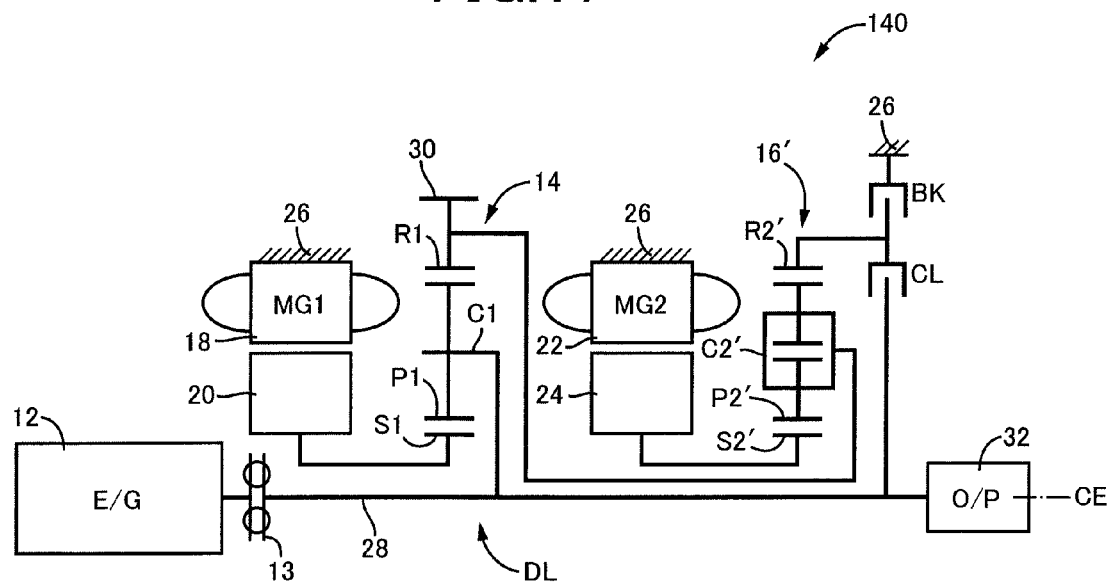
FIG. 17 is a schematic view for explaining an arrangement of a hybrid vehicle drive system according to still another preferred embodiment of this invention.
Figure 18:
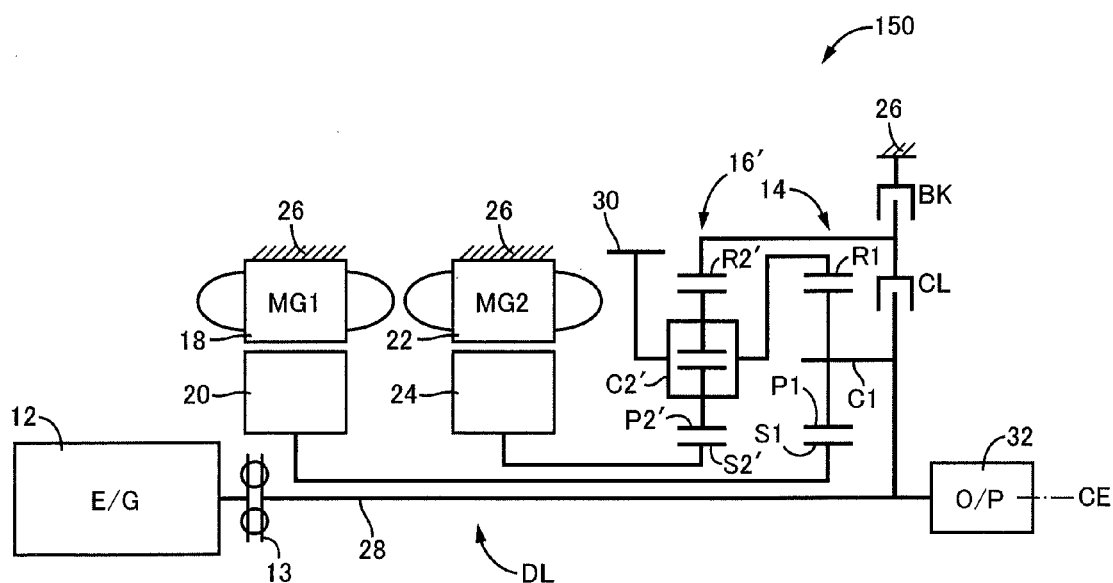
FIG. 18 is a schematic view for explaining an arrangement of a hybrid vehicle drive system according to yet another preferred embodiment of this invention.

FIG. 12 is the flow chart for explaining a major portion of a control operation of the electronic control device 40 of FIG. 2. This flow chart illustrates an engine-start clutch controlling routine executed when the engine is required to be started while the output gear 30 is locked by the parking lock device 62. The engine-start clutch controlling routine of FIG. 12 is initiated with step S1 ("step" being hereinafter omitted) corresponding to the first dwelling speed calculating portion 80, to calculate, prior to the rise of the engine speed $N_E$, the first dwelling speed NT1 to be established in the first half period A during the rise of the engine speed $N_E$, on the basis of the temperature $T_E$ of the engine 12 and according to the predetermined relationship obtained by experimentation. Then, the control flow goes to S2 corresponding to the first resonance speed selecting portion 82, to select one of the predetermined first resonance speeds NR1on and NR1off of the drive line DL, on the basis of the first dwelling speed NT1 calculated in S1 and the first resonance speeds NR1on and NR1off, such that the selected first resonance speed NR1on or NR1off provides a larger difference (NT1−NR1on) or (NT1−NR1off) with respect to the calculated first dwelling speed NT1. The control flow then goes to S3 corresponding to the first clutch controlling portion 84, to place the clutch CL in the engaged or released state such that the resonance speed of the drive line DL in the first half period A coincides with one of the first resonance speeds NR1on and NR1off selected by the first resonance speed selecting portion 82.

S4 is then implemented to determine whether the rise of the engine speed $N_E$ has entered the second half period. For example, this determination is made by determining whether the engine speed $N_E$ has exceeded a predetermined threshold value NK at which the initial explosion is expected, or whether the initial explosion has taken place. The control flow then goes to S5 corresponding to the second dwelling speed calculating portion 86, to calculate the second dwelling speed NT2 to be established in the second half period B during the rise of the engine speed $N_E$, on the basis of the temperature $T_E$ of the engine 12 and according to the predetermined relationship obtained by experimentation. Then, the control flow goes to S6 corresponding to the second resonance speed selecting portion 88, to select one of the predetermined second resonance speeds NR2on and NR2off of the drive line DL, on the basis of the second dwelling speed NT2 calculated in S5 and the second resonance speeds NR2on and NR2off, such that the selected second resonance speed NR2on or NR2off provides a larger difference (NT2−NR2on) or (NT2−NR2off) with respect to the calculated second dwelling speed NT2. The control flow then goes to S7 corresponding to the second clutch controlling portion 90, to place the clutch CL in the engaged or released state such that the resonance speed of the drive line DL in the second half period B coincides with one of the second resonance speeds NR2on and NR2off selected by the second resonance speed selecting portion 88.

In the engaged state of the clutch CL, an inertia of the rotor of the second electric motor MG2 is added to the inertia of the drive line DL, so that the first resonance speed NR1 or the second resonance speed NR2 of the drive line DL is lowered. In the released state of the clutch CL, the inertia of the rotor of the second electric motor MG2 is subtracted from the drive line DL, so that the first resonance speed NR1 or the second resonance speed NR2 of the drive line DL is raised.

The hybrid vehicle drive control device of the present embodiment is configured to control the operating state of the clutch CL during cranking of the engine 12 to raise its speed $N_E$ for starting the engine 12, so as to prevent generation of resonance of the drive line DL due to a rotary motion pulsation of the engine 12. Accordingly, it is possible to effectively reduce generation of vibrations of the drive line DL extending from the engine 12 to the first electric motor MG1 connected to the differential device through the torsional damper device 13, during cranking of the engine 12.

The present hybrid vehicle drive control device is further configured such that the operating state of the clutch CL is controlled so as to obtain a larger one of differences (NT1−NR1on) and (NT1−NR1off) between the first dwelling speed NT1 to be established in the first half period A of a rise of the speed $N_E$ of the engine 12, and the predetermined first resonance speed values NR1on and NR1off of the drive line DL extending from the engine 12 to the first electric motor MG1 connected to the first planetary gear set 14 through the torsional damper device 13, which first resonance speed values correspond to the explosion 1-order frequency of the engine 12. Since the operating state of the clutch CL is controlled so as to obtain the larger one of the above-indicated differences in the first half period A of the rise of the engine speed $N_E$, a rate of rise of the engine speed $N_E$ above the first resonance speed NR1on or NR1off is increased so that the engine speed $N_E$ can be rapidly raised through a resonance band, whereby it is possible to avoid generation of resonance of the drive line DL, and consequently reduce generation of noises and vibrations of the drive line DL.

The present hybrid vehicle drive control device is further configured such that the operating state of the above-described clutch CL is controlled so as to obtain a larger one of differences (NT2−NR2on) and (NT2−NR2off) between the second dwelling speed NT2 to be established in the second half period B of the rise of the speed $N_E$ of the engine 12, and the predetermined second resonance speed values NR2on and NR2off of the drive line DL extending from the engine 12 to the first electric motor MG1 connected to the first planetary gear set 14 through the torsional damper device 13, which second resonance speed values correspond to the revolution 0.5-order pulsation of the engine 12. Since the operating state of the clutch CL is controlled so as to obtain the larger one of the above-indicated differences in the second half period B of the rise of the engine speed $N_E$, it is possible to avoid a rise of the engine speed $N_E$ to or above the second resonance speed NR2on or NR2off, so that it is possible to avoid generation of resonance of the drive line DL, and consequently reduce generation of noises and vibrations of the drive line DL.

The present hybrid vehicle drive control device is also configured to calculate each of the first and second dwelling speeds NT1 and NT2 on the basis of the temperature $T_E$ of the engine 12 and a predetermined relationship. Accordingly, the first and second dwelling speeds NT1 and NT2 which vary with a change of the temperature $T_E$ of the engine 12 can be obtained with a high degree of accuracy, so that the resonance of the drive line DL can be avoided with a high degree of accuracy, whereby the generation of the noises and vibrations can be effectively reduced.

The present hybrid vehicle drive control device is further configured such that the engine 12 is started while the hybrid vehicle is held stationary, and while the output gear (output rotary member) 30 is locked by the parking mechanism 62 to inhibit a rotary motion of the output gear 30. Accordingly, the parking mechanism receives a reaction force generated during a rise of the engine speed $N_E$ with the first electric motor MG1, assuring an advantage that a change of the operating state of the clutch CL does not cause a change of a drive force of the hybrid vehicle.

Other preferred embodiments of the present invention will be described in detail by reference to the drawings. In the following description, the same reference signs will be used to identify the same elements in the different embodiments, which will not be described redundantly.

Second Embodiment

FIGS. 13-18 are the schematic views for explaining arrangements of respective hybrid vehicle drive systems 100, 110, 120, 130, 140 and 150 according to other preferred modes of this invention used instead of the hybrid vehicle drive system 10 of the previous embodiment. The hybrid vehicle drive control device of the present invention is also applicable to drive systems such as the drive system 100 shown in FIG. 13 and the drive system 110 shown in FIG. 14, which have respective different arrangements of the first electric motor MG1, first planetary gear set 14, second electric motor MG2, second planetary gear set 16, clutch CL and brake BK in the direction of the center axis CE. The present hybrid vehicle drive control device is also applicable to drive systems such as the drive system 120 shown in FIG. 15, which have a one-way clutch OWC disposed between the carrier C2 of the second planetary gear set 16 and the stationary member in the form of the housing 26, in parallel with the brake BK, such that the one-way clutch OWC permits a rotary motion of the carrier C2 relative to the housing 26 in one of opposite directions and inhibits a rotary motion of the carrier C2 in the other direction. The present hybrid vehicle drive control device is further applicable to drive systems such as the drive system 130 shown in FIG. 16, the drive system 140 shown in FIG. 17 and the drive system 150 shown in FIG. 18, which are provided with a second differential mechanism in the form of a second planetary gear set 16' of a double-pinion type, in place of the second planetary gear set 16 of a single-pinion type. This second planetary gear set 16' is provided with rotary elements (elements) consisting of: a first rotary element in the form of a sun gear S2'; a second rotary element in the form of a carrier C2' supporting a plurality of pinion gears P2' meshing with each other such that each pinion gear P2' is rotatable about its axis and the axis of the planetary gear set; and a third rotary element in the form of a ring gear R2' meshing with the sun gear S2' through the pinion gears P2'.

Each of the hybrid vehicle drive systems 100, 110, 120, 130, 140 and 150 according to the present second embodiment is provided with: a first differential mechanism in the form of the first planetary gear set 14 having a first rotary element in the form of the sun gear S1 connected to the first electric motor MG1, a second rotary element in the form of the carrier C1 connected to the engine 12, and a third rotary element in the form of the ring gear R1 connected to a output rotary member in the form of the output gear 30; a second differential mechanism in the form of the second planetary gear set 16 (16') having a first rotary element in the form of the sun gear S2 (S2') connected to the second electric motor MG2, a second rotary element in the form of the carrier C2 (C2') and a third rotary element in the form of the ring gear R2 (R2'), one of the carrier C2 (C2') and the ring gear R2 (R2') being connected to the ring gear R1 of the first planetary gear set 14; the clutch CL for selectively connecting the carrier C1 of the first planetary gear set 14 and the other of the carrier C2 (C2') and the ring gear R2 (R2') which is not connected to the ring gear R1, to each other; and the brake BK for selectively connecting the other of the carrier C2 (C2') and the ring gear R2 (R2') which is not connected to the ring gear R1, to a stationary member in the form of the housing 26. Accordingly, the electronic control device 40 applied to the present second embodiment wherein the first planetary gear set 14 and the second planetary gear set 16 (16') as a whole have four rotary elements represented in the collinear chart has the same advantages as the first embodiment described above. For example, the electronic control device 40 is configured to control the operating state of the clutch CL during cranking of the engine 12 to raise its speed $N_E$ for starting the engine 12, so as to prevent generation of resonance of the drive line DL due to a rotary motion pulsation of the engine 12. Accordingly, it is possible to effectively reduce generation of vibrations of the drive line DL extending from the engine 12 to the first electric motor MG1 connected to the differential device through the torsional damper device 13, during cranking of the engine 12.

Third Embodiment

Figure 19:
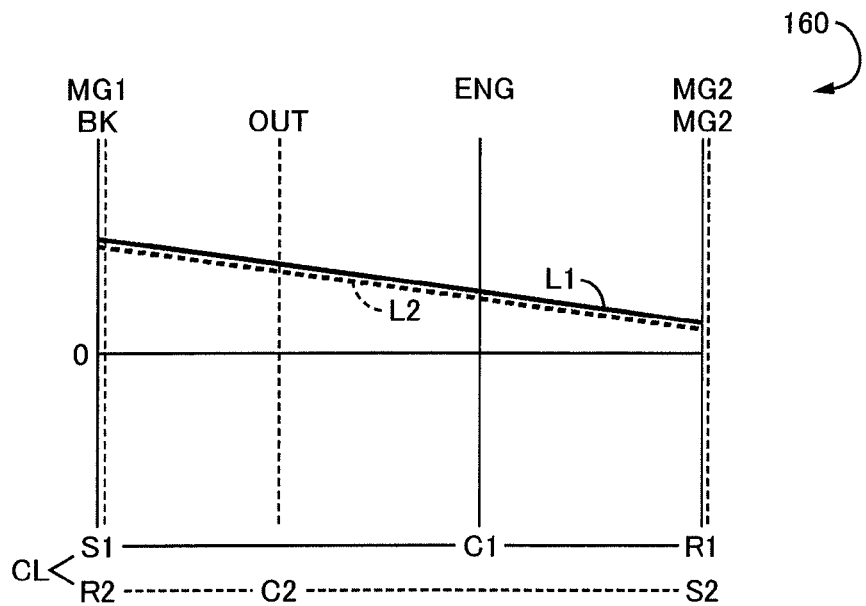
FIG. 19 is a collinear chart for explaining an arrangement and an operation of a hybrid vehicle drive system according to another preferred embodiment of this invention.
Figure 20:
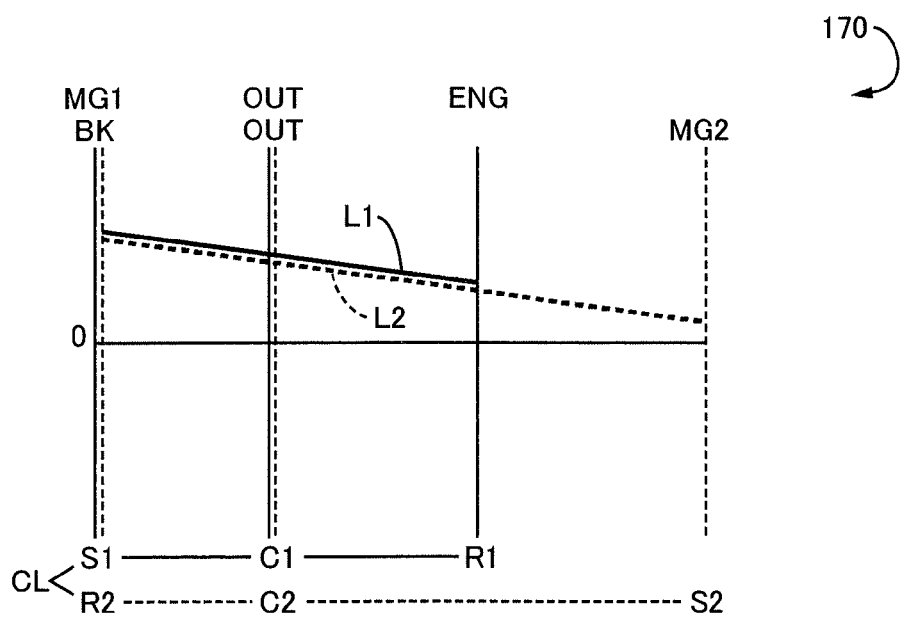
FIG. 20 is a collinear chart for explaining an arrangement and an operation of a hybrid vehicle drive system according to a further preferred embodiment of this invention.
Figure 21:
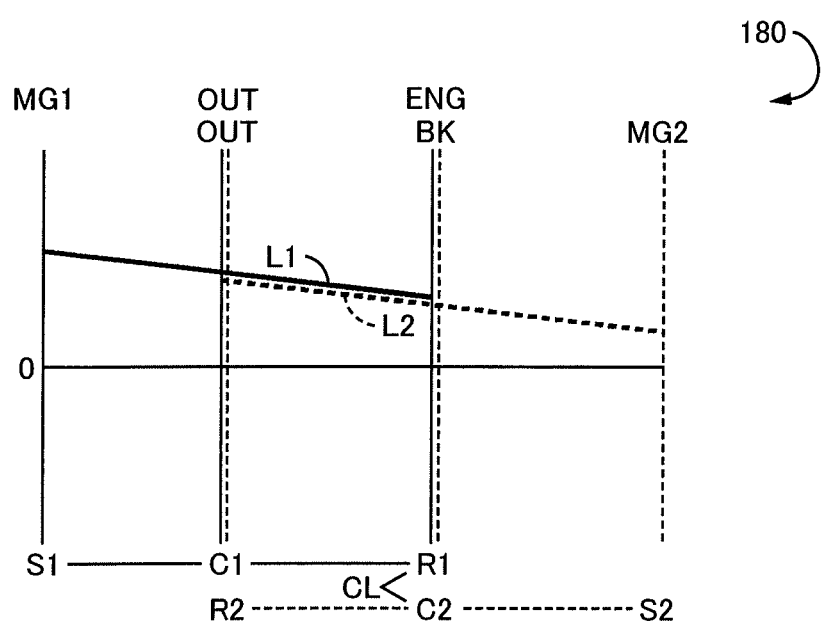
FIG. 21 is a collinear chart for explaining an arrangement and an operation of a hybrid vehicle drive system according to a still further preferred embodiment of this invention.

FIGS. 19-21 are the collinear charts for explaining arrangements and operations of respective hybrid vehicle drive systems 160, 170 and 180 according to other preferred modes of this invention in place of the drive system 10. In FIGS. 19-21, the relative rotating speeds of the sun gear S1, carrier C1 and ring gear R1 of the first planetary gear set 14 are represented by the solid line L1, while the relative rotating speeds of the sun gear S2, carrier C2 and ring gear R2 of the second planetary gear set 16 are represented by the broken line L2, as in FIGS. 4-7. In the drive system 160 for the hybrid vehicle, the sun gear S1, carrier C1 and ring gear R1 of the first planetary gear set 14 are respectively connected to the first electric motor MG1, engine 12 and second electric motor MG2, while the sun gear S2, carrier C2 and ring gear R2 of the second planetary gear set 16 are respectively connected to the second electric motor MG2 and output gear 30, and to the housing 26 through the brake BK. The sun gear S1 and the ring gear R2 are selectively connected to each other through the clutch CL. In the drive system 170 for the hybrid vehicle, the sun gear S1, carrier C1 and ring gear R1 of the first planetary gear set 14 are respectively connected to the first electric motor MG1, output gear 30 and engine 12, while the sun gear S2, carrier C2 and ring gear R2 of the second planetary gear set 16 are respectively connected to the second electric motor MG2 and output gear 30, and to the housing 26 through the brake BK. The sun gear S1 and the ring gear R2 are selectively connected to each other through the clutch CL. In the drive system 180 for the hybrid vehicle, the sun gear S1, carrier C1 and ring gear R1 of the first planetary gear set 14 are respectively connected to the first electric motor MG1, output gear 30 and engine 12, while the sun gear S2, carrier C2 and ring gear R2 of the second planetary gear set 16 are respectively connected to the second electric motor MG2, to the housing 26 through the brake BK, and to the output gear 30. The ring gear R1 and the carrier C2 are selectively connected to each other through the clutch CL.

The electronic control device 40 applied to the present second embodiment of FIGS. 19-21, as the embodiment illustrated in FIG. 7, wherein the first planetary gear set 14 and the second planetary gear set 16 (16') as a whole have four rotary elements represented in the collinear chart has the same advantages as the first embodiment described above. For example, the electronic control device 40 is configured to control the operating state of the clutch CL during cranking of the engine 12 to raise its speed $N_E$ for starting the engine 12, so as to prevent generation of resonance of the drive line DL due to a rotary motion pulsation of the engine 12. Accordingly, it is possible to effectively reduce generation of vibrations of the drive line DL extending from the engine 12 to the first electric motor MG1 connected to the differential device through the torsional damper device 13, during cranking of the engine 12.

The drive systems for the hybrid vehicle shown in FIGS. 1, 4-7, 13-18 and 19-21 are identical with each other in that each of these drive systems for the hybrid vehicle is provided with the first differential mechanism (first planetary gear set 14) and the second differential mechanism (second planetary gear set 16, 16') as a whole have four rotary elements represented in the collinear chart, and is further provided with the first electric motor MG1, second electric motor MG2, engine 12 and output rotary member (output gear 30) which are connected to the respective four rotary elements, and the brake BK for selectively fixing the rotary element connected to the engine 12, to the stationary member. In these drive systems for the hybrid vehicle, one of the four rotary elements is constituted by the rotary element of the first differential mechanism (first planetary gear set 14) and the rotary element of the second differential mechanism (second planetary gear set 16, 16') which are selectively connected to each other through the clutch CL, and the motor drive modes in which the first and second electric motors MG1 and MG2 are operated to drive the hybrid vehicle are established by placing the brake BK and the clutch CL in the engaged state.

While the preferred embodiments of this invention have been described by reference to the drawings, it is to be understood that the invention is not limited to the details of the illustrated embodiments.

In the illustrated embodiments, the operating state of the clutch CL is controlled to reduce generation of vibrations of the drive line DL in the first half period A and the second half period B of the rise of the engine speed $N_E$, for instance. However, the operating state of the clutch CL may be controlled to reduce generation of vibrations of the drive line DL in only one of the first and second half periods A and B.

The illustrated embodiments are further configured to control the operating state of the clutch CL for reducing generation of vibrations of the drive line DL, for instance, so as to obtain a larger one of the differences (NT1−NR1on) and (NT1−NR1off) between the first dwelling speed NT1 to be established during the first half period A of the rise of the speed of the engine 12, and the predetermined first resonance speeds NR1on and NR1off of the drive line DL extending from the engine 12 to the first electric motor MG1 connected to the first planetary gear set 14 through the torsional damper device 13, which first resonance speeds NR1on and NR1off correspond to the explosion 1-order frequency of the engine 12. In this respect, it is noted that the clutch CL may be switched not only from the engaged state to the released state, but also from the released state to the engaged state.

It is to be understood that the embodiments described above are given for illustrative purpose only, and that the invention may be embodied with various changes without departing from the sprit and scope of the present invention.

NOMENCLATURE OF REFERENCE SIGNS

10, 100, 110, 120, 130, 140, 150, 160, 170, 180: Hybrid vehicle drive system
12: Engine 13: Torsional damper device
14: First planetary gear set (First differential mechanism)
16, 16': Second planetary gear set (Second differential mechanism)
30: Output gear (Output rotary member)
40: Electronic control device (Drive control device)
62: Parking lock device (Parking mechanism)
70: Engine start requirement determining portion 78: Engine start control portion
80: First dwelling speed calculating portion
82: First resonance speed selecting portion
84: First clutch controlling portion
86: Second dwelling speed calculating portion
88: Second resonance speed selecting portion
90: Second clutch controlling portion
BK: Brake CL: Clutch Cl, C2, C2': Carrier (Second rotary element)
MG1: First electric motor MG2: Second electric motor
R1, R2, R2' : Ring gear (Third rotary element)
S1, S2, S2': Sun gear (First rotary element)
DL: Drive line
NT1: First dwelling speed
NT2: Second dwelling speed
NR1on: First resonance speed in engaged state of clutch
NR1off: First resonance speed in released state of clutch
NR2on: Second resonance speed in engaged state of clutch
NR2off: Second resonance speed in released state of clutch
$T_E$: Engine temperature
$N_E$: Engine speed The invention clamed is:

1. teaches a drive control device for a hybrid vehicle provided with:
   a differential device which includes a first differential mechanism and a second differential mechanism and which has four rotary elements; and
   an engine,
   a first electric motor,
   a second electric motor and
   an output rotary member which are respectively connected to said four rotary elements, and
   wherein one of said four rotary elements is constituted by a rotary component of said first differential mechanism and a rotary component of said second differential mechanism which are selectively connected to each other through a clutch, and
   one of the rotary components of said first and second differential mechanisms which are selectively connected to each other through said clutch is selectively fixed to a stationary member through a brake,
   said drive control device comprising:
   an engine start control portion configured to switch an operating state of said clutch during cranking of said engine to raise its speed for starting said engine, and
   wherein said engine start control portion includes:
   a first clutch controlling portion configured to place said clutch in one of a released state and an engaged state in which a difference between a first dwelling speed to be established in a first half period of a rise of a speed of said engine and a first resonance speed of a drive line extending from said engine to said first electric motor connected to said first differential mechanism through a torsional damper is larger in the other of said released and engaged states,
   said first resonance speed corresponding to an explosion 1-order frequency of said engine; and
   a second clutch controlling portion configured to place said clutch in one of said released and engaged states in which a difference between a second dwelling speed to be established in a second half period of the rise of the speed of said engine and a predetermined second resonance speed of said drive line is larger in the other of said released and engaged states,
   said predetermined second resonance speed corresponding to a revolution 0.5-order pulsation frequency of said engine.

2. The drive control device according to claim 1, wherein said engine start control portion further includes a first dwelling speed calculating portion configured to calculate said first dwelling speed on the basis of a temperature of said engine and a predetermined relationship between said first dwelling speed and said temperature.

3. The drive control device according to claim 1, wherein said engine start control portion further includes a second dwelling speed calculating portion configured to calculate said second dwelling speed on the basis of a temperature of said engine and a predetermined relationship between said second dwelling speed and said temperature.

4. The drive control device according to claim 1, wherein said engine start control portion commands said engine to be started while the hybrid vehicle is held stationary, and while said output rotary member is locked by a parking mechanism to inhibit a rotary motion of the output rotary member.

5. The drive control device according to claim 1, wherein an inertia of a rotor of said second electric motor is added to an inertia of said drive line when said clutch is placed in said engaged state, so that said first resonance speed or said second resonance speed of said drive line is lowered, and the inertia of the rotor of said second electric motor is subtracted from the inertia of said drive line when said clutch is placed in said released state, so that the first resonance speed or second resonance speed of said drive line is raised.

6. The drive control device according to claim 1, wherein said first differential mechanism is provided with a first rotary element connected to said first electric motor, a second rotary element connected to said engine, and a third rotary element connected to said output rotary member, while said second differential mechanism is provided with a first rotary element connected to said second electric motor, a second rotary element, and a third rotary element, one of the second and third rotary elements of the second differential mechanism being connected to the third rotary element of said first differential mechanism,
   and wherein said clutch is configured to selectively connect the second rotary element of said first differential mechanism, and the other of the second and third rotary elements of said second differential mechanism which is not connected to the third rotary element of said first differential mechanism, to each other, while said brake is configured to selectively fix the other of the second and third rotary elements of said second differential mechanism which is not connected to the third rotary element of said first differential mechanism, to the stationary member.

* * * * *